(12) United States Patent
Turner et al.

(10) Patent No.: US 9,528,871 B2
(45) Date of Patent: Dec. 27, 2016

(54) SYSTEM FOR DETERMINING A LIQUID QUANTITY AND ORIENTATION

(71) Applicant: Deere & Company, Moline, IL (US)

(72) Inventors: Christopher D Turner, Waterloo, IA (US); Christopher L Bradshaw, Sherard, IL (US); Michael J Pipho, Dunkerton, IA (US); Bruce L Upchurch, Waterloo, IA (US)

(73) Assignee: DEERE & COMPANY, Moline, IL (US)

( * ) Notice: Subject to any disclaimer, the term of this patent is extended or adjusted under 35 U.S.C. 154(b) by 291 days.

(21) Appl. No.: 14/079,028

(22) Filed: Nov. 13, 2013

(65) Prior Publication Data

US 2015/0130929 A1    May 14, 2015

(51) Int. Cl.
   *G01F 23/00*    (2006.01)
   *G01F 22/00*    (2006.01)
   *G01F 23/292*   (2006.01)

(52) U.S. Cl.
   CPC ........... *G01F 23/0076* (2013.01); *G01F 22/00* (2013.01); *G01F 23/292* (2013.01)

(58) Field of Classification Search
   CPC ..... G06F 23/0076; G06F 23/292; G06F 22/00
   USPC .......................................................... 348/135
   See application file for complete search history.

(56) References Cited

U.S. PATENT DOCUMENTS

| | | | |
|---|---|---|---|
| 4,286,464 A | 9/1981 | Tauber et al. | |
| 4,606,226 A | 8/1986 | Krohn | |
| 5,381,022 A | 1/1995 | Nemeth et al. | |
| 6,098,029 A * | 8/2000 | Takagi | G01F 23/292 382/100 |
| 6,118,134 A * | 9/2000 | Justak | G01F 23/292 250/574 |
| 6,225,125 B1 * | 5/2001 | Lapidus | C12M 41/36 422/73 |
| 6,448,574 B1 | 9/2002 | Chow | |
| 6,915,689 B2 | 7/2005 | Edvardsson | |
| 7,109,512 B2 | 9/2006 | Wirthlin | |
| 7,982,201 B2 | 7/2011 | Bryant et al. | |
| 8,184,848 B2 | 5/2012 | Wu et al. | |
| 8,823,778 B2 | 9/2014 | Endo | |
| 9,038,442 B2 | 5/2015 | Reimer et al. | |
| 2002/0152809 A1 | 10/2002 | Shirai et al. | |
| 2004/0011127 A1 | 1/2004 | Huemer et al. | |
| 2004/0173021 A1 | 9/2004 | Lizon et al. | |
| 2006/0288776 A1 | 12/2006 | Pelovitz | |

(Continued)

FOREIGN PATENT DOCUMENTS

| | | |
|---|---|---|
| EP | 1752743 A1 | 2/2007 |
| EP | 2015035 A1 | 1/2009 |

*Primary Examiner* — Christopher S Kelley
*Assistant Examiner* — Zhihan Zhou

(57) ABSTRACT

A system including a vessel, an image capturing device, and a processor. The vessel at least partially contacts a liquid, wherein the liquid has a liquid surface that is defined by a quantity of the liquid, a shape of the vessel, and an orientation of the vessel relative to a horizontal plane. The image capturing device is spaced apart from the liquid surface and captures an image thereof. The processor is in communication with the image capturing device for analyzing a characteristic of the image and determining an attribute of the liquid therefrom.

17 Claims, 23 Drawing Sheets

(56) References Cited

U.S. PATENT DOCUMENTS

| | | | |
|---|---|---|---|
| 2007/0227272 A1* | 10/2007 | Northrop | G01F 23/0038 73/865 |
| 2008/0022768 A1 | 1/2008 | Bell et al. | |
| 2008/0143828 A1* | 6/2008 | Mandrachia | G01N 21/8507 348/82 |
| 2008/0304082 A1* | 12/2008 | Gotz | G01F 23/292 356/614 |
| 2009/0067669 A1* | 3/2009 | Kojima | G01F 23/2928 382/100 |
| 2009/0107234 A1 | 4/2009 | Kim et al. | |
| 2010/0017052 A1 | 1/2010 | Luce | |
| 2010/0182136 A1 | 7/2010 | Pryor | |
| 2010/0236324 A1* | 9/2010 | Tajima | G01N 30/6043 73/61.57 |
| 2010/0258575 A1* | 10/2010 | Fang | A47G 19/2227 220/662 |
| 2010/0286933 A1 | 11/2010 | Boa | |
| 2010/0322462 A1 | 12/2010 | Wu et al. | |
| 2011/0056290 A1* | 3/2011 | Bryant | G01F 23/292 73/293 |
| 2011/0077876 A1 | 3/2011 | Ellingsen et al. | |
| 2011/0268329 A1 | 11/2011 | Pronkine | |
| 2012/0018037 A1 | 1/2012 | Nakagawa et al. | |
| 2012/0096939 A1 | 4/2012 | Moekander | |
| 2013/0074614 A1* | 3/2013 | Holmes | B01L 3/50825 73/864.01 |
| 2013/0216673 A1 | 8/2013 | Storek et al. | |
| 2014/0326038 A1* | 11/2014 | Fauveau | G01F 25/0061 73/1.73 |

* cited by examiner

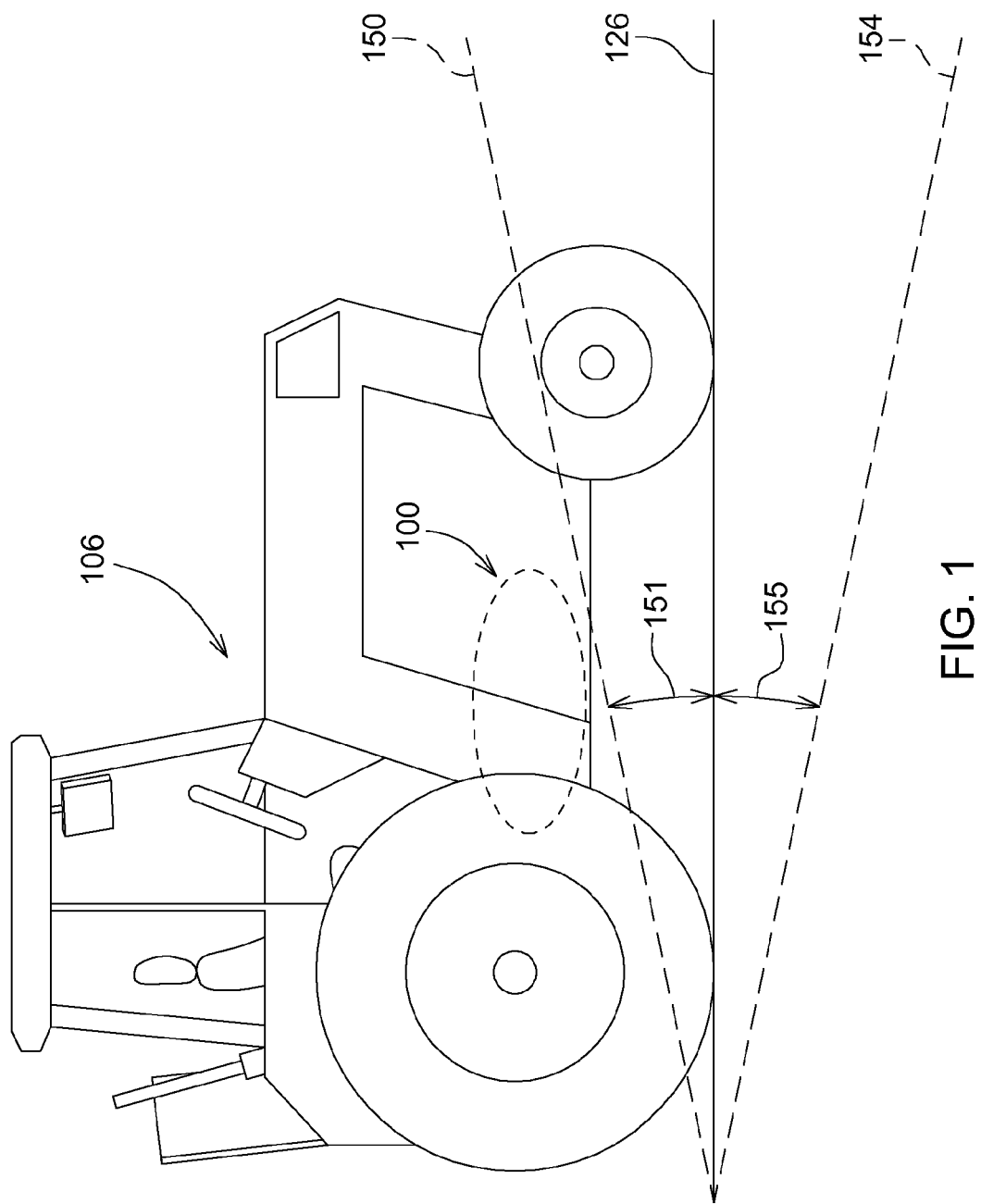

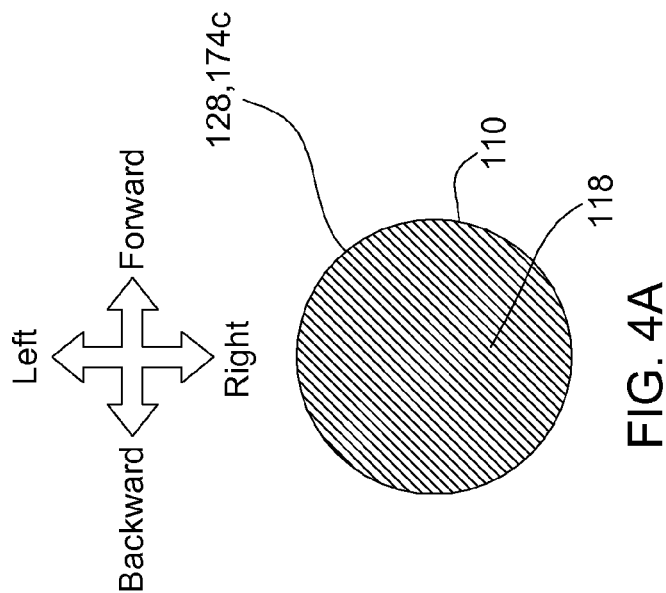
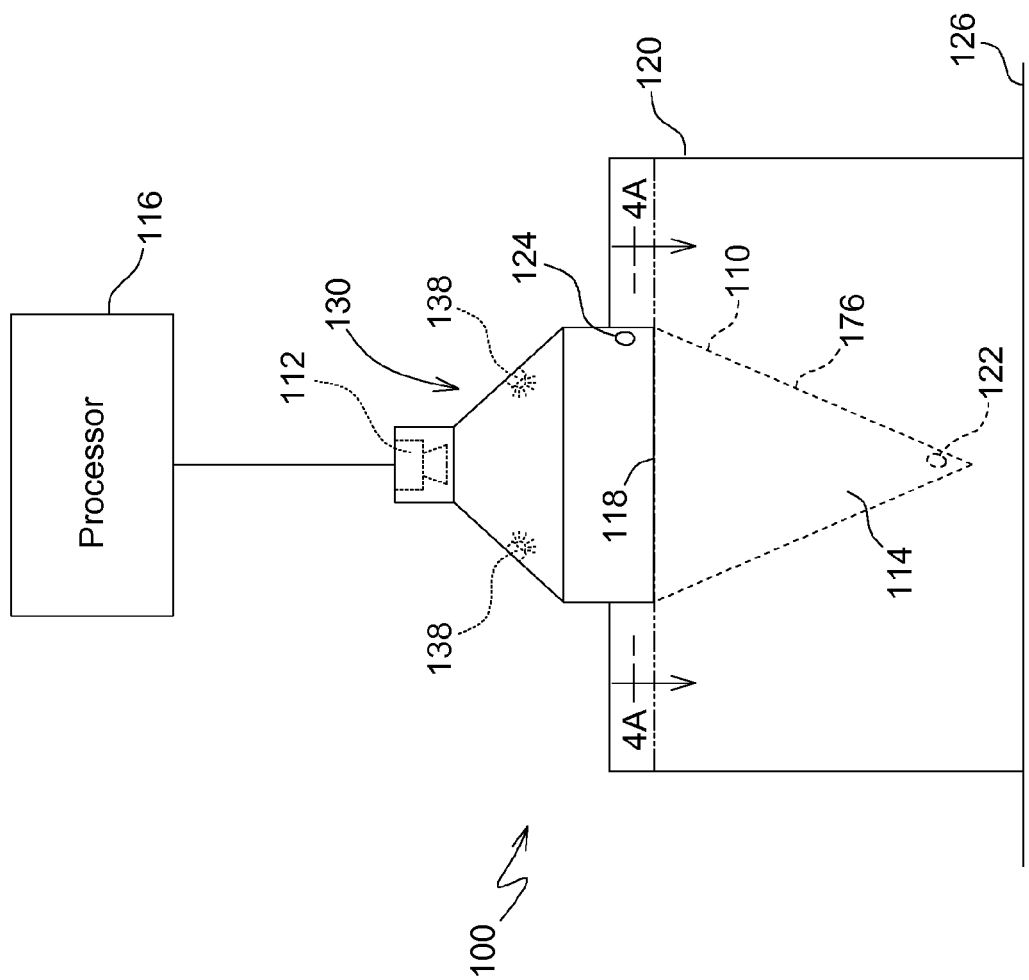

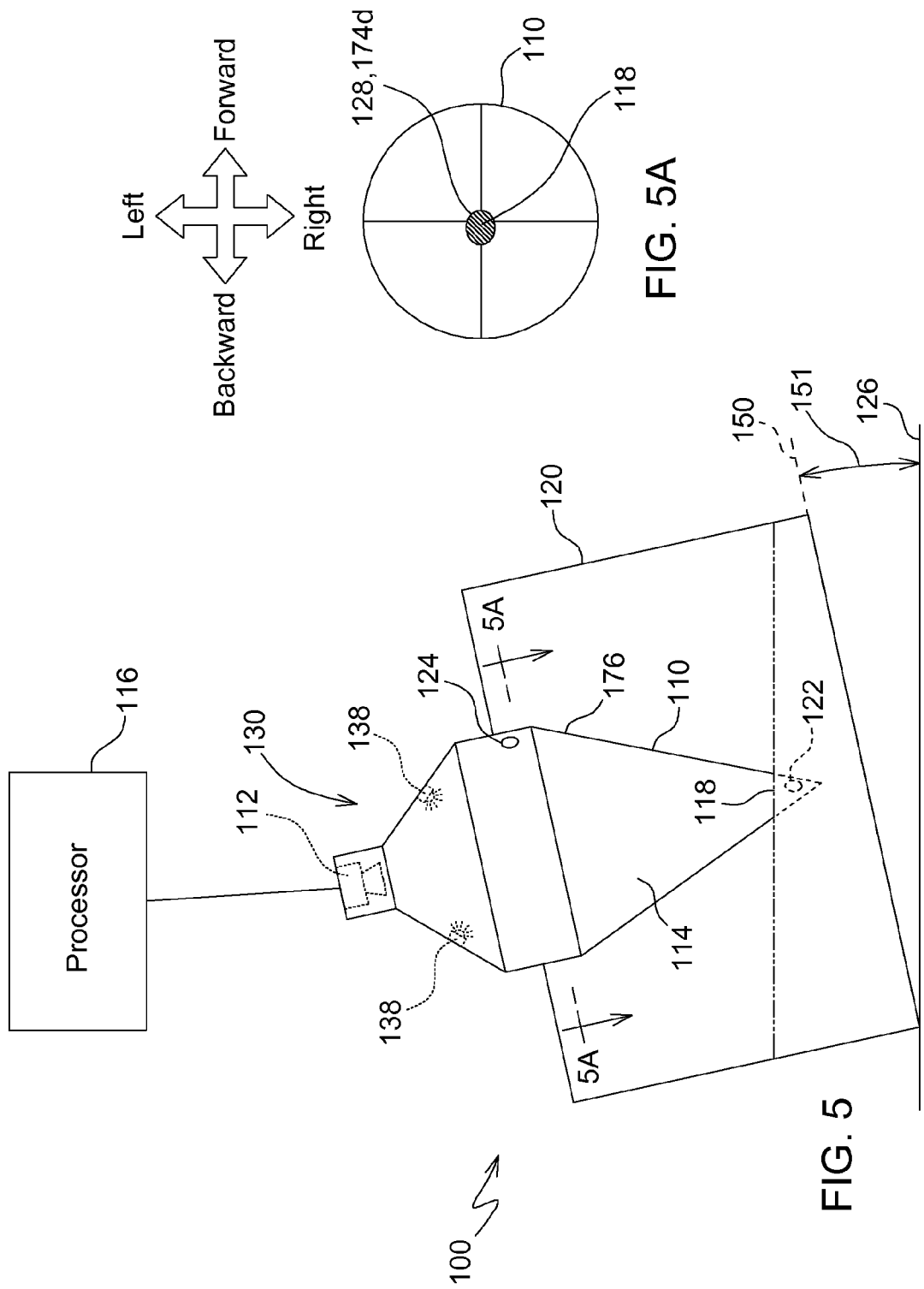

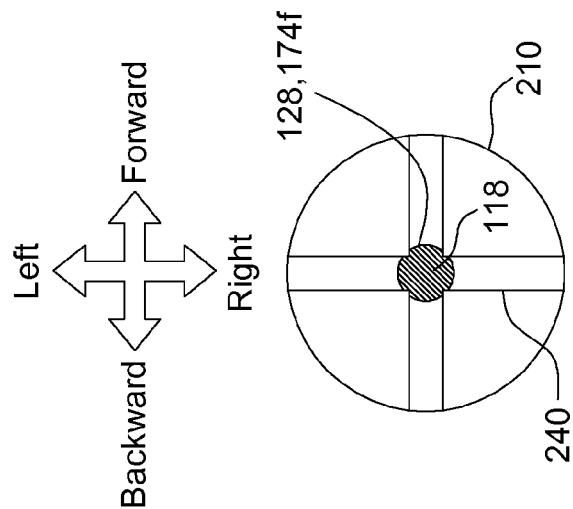
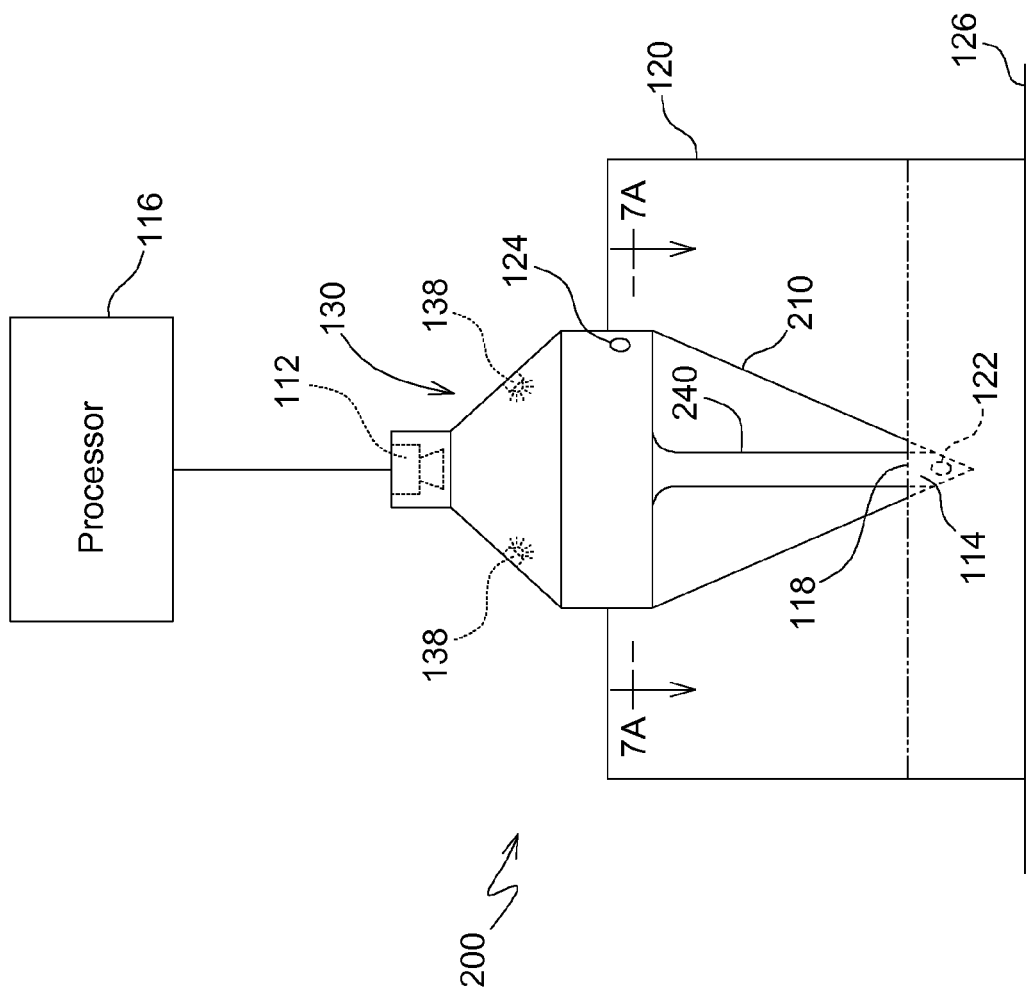

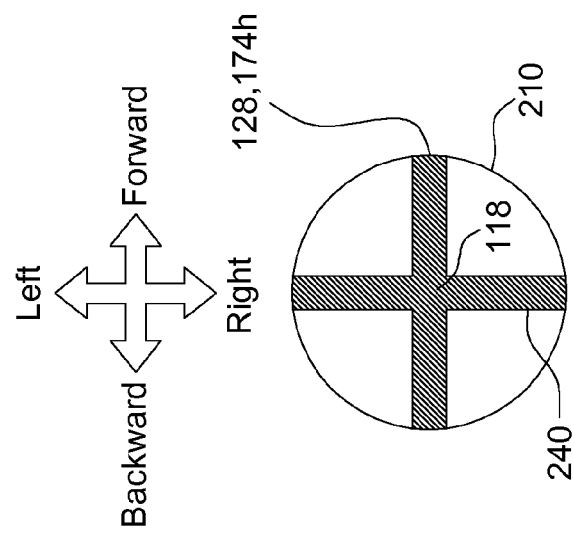
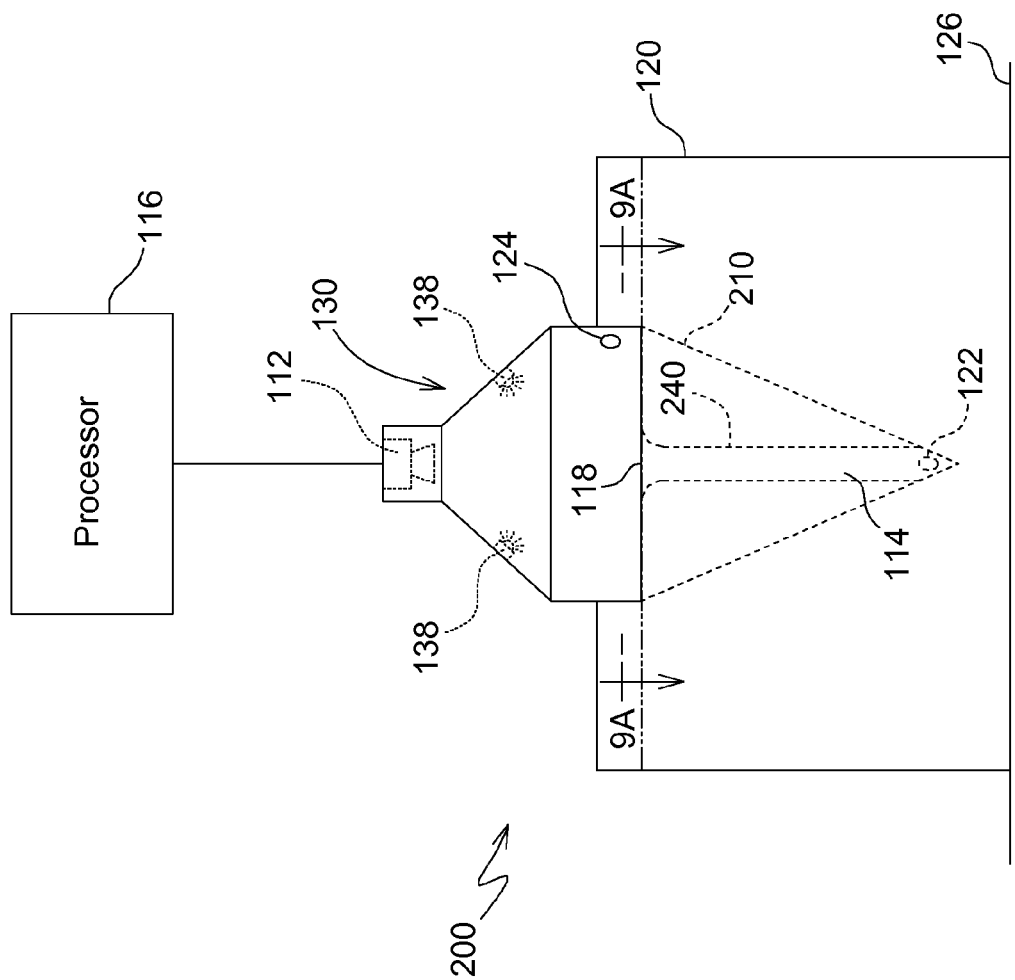

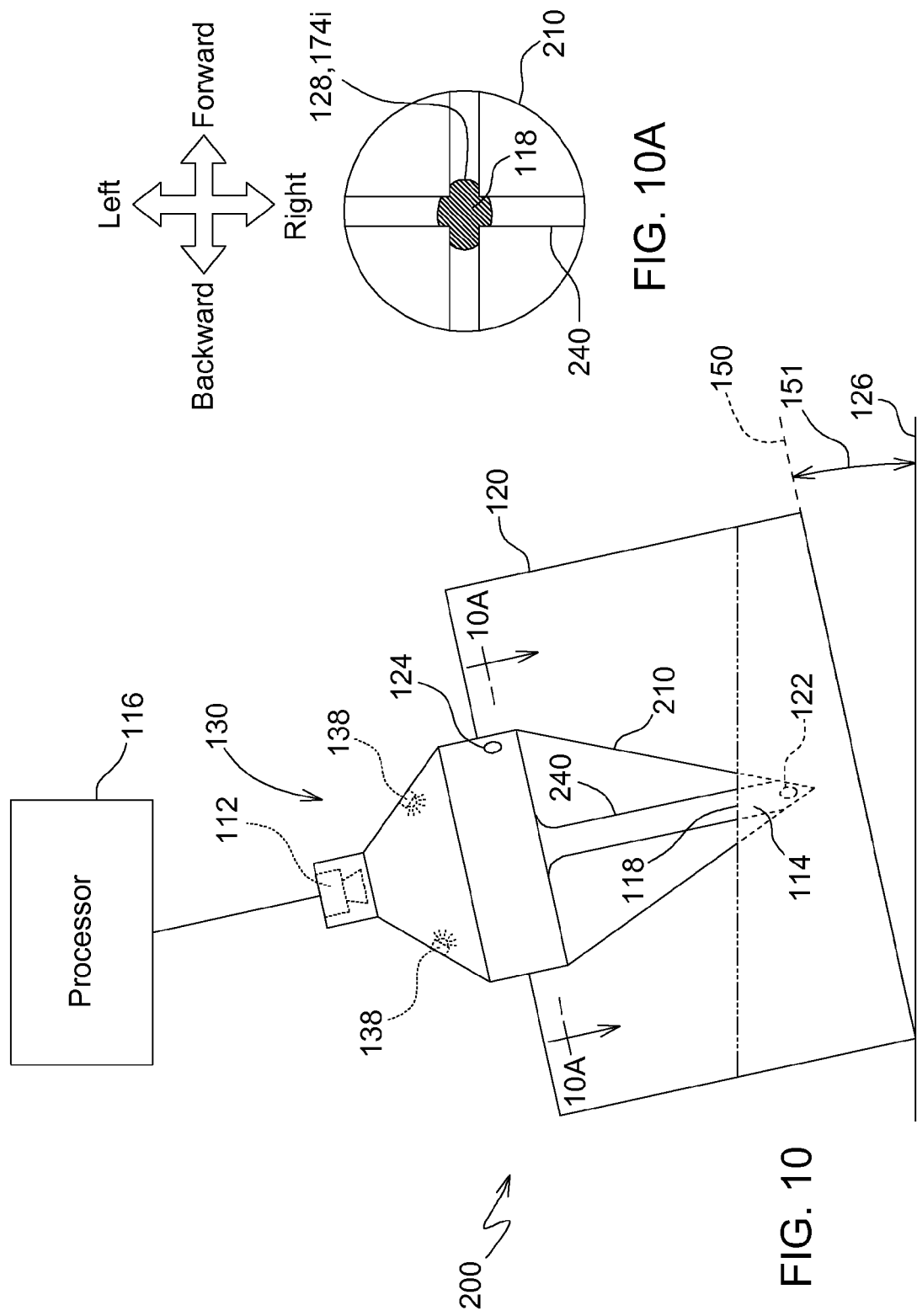

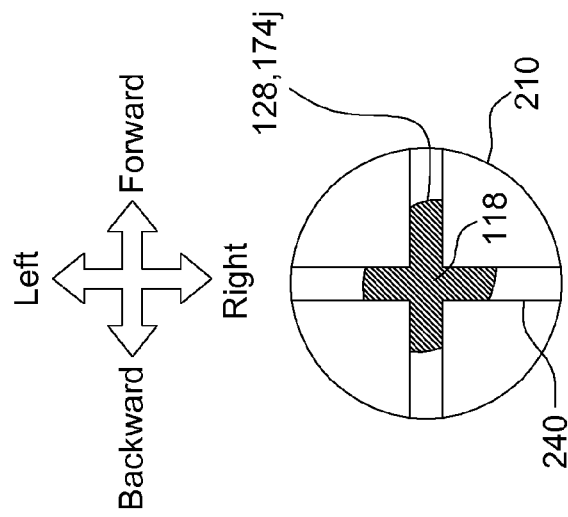
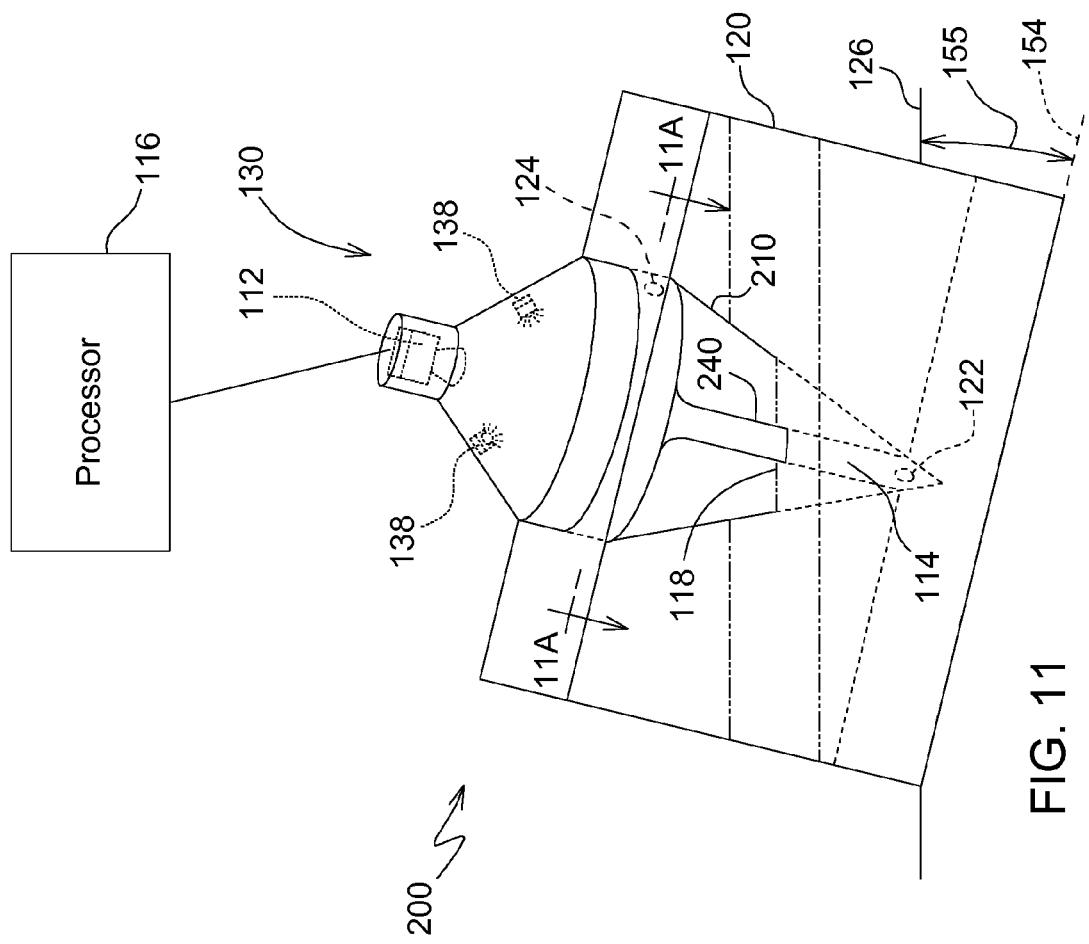

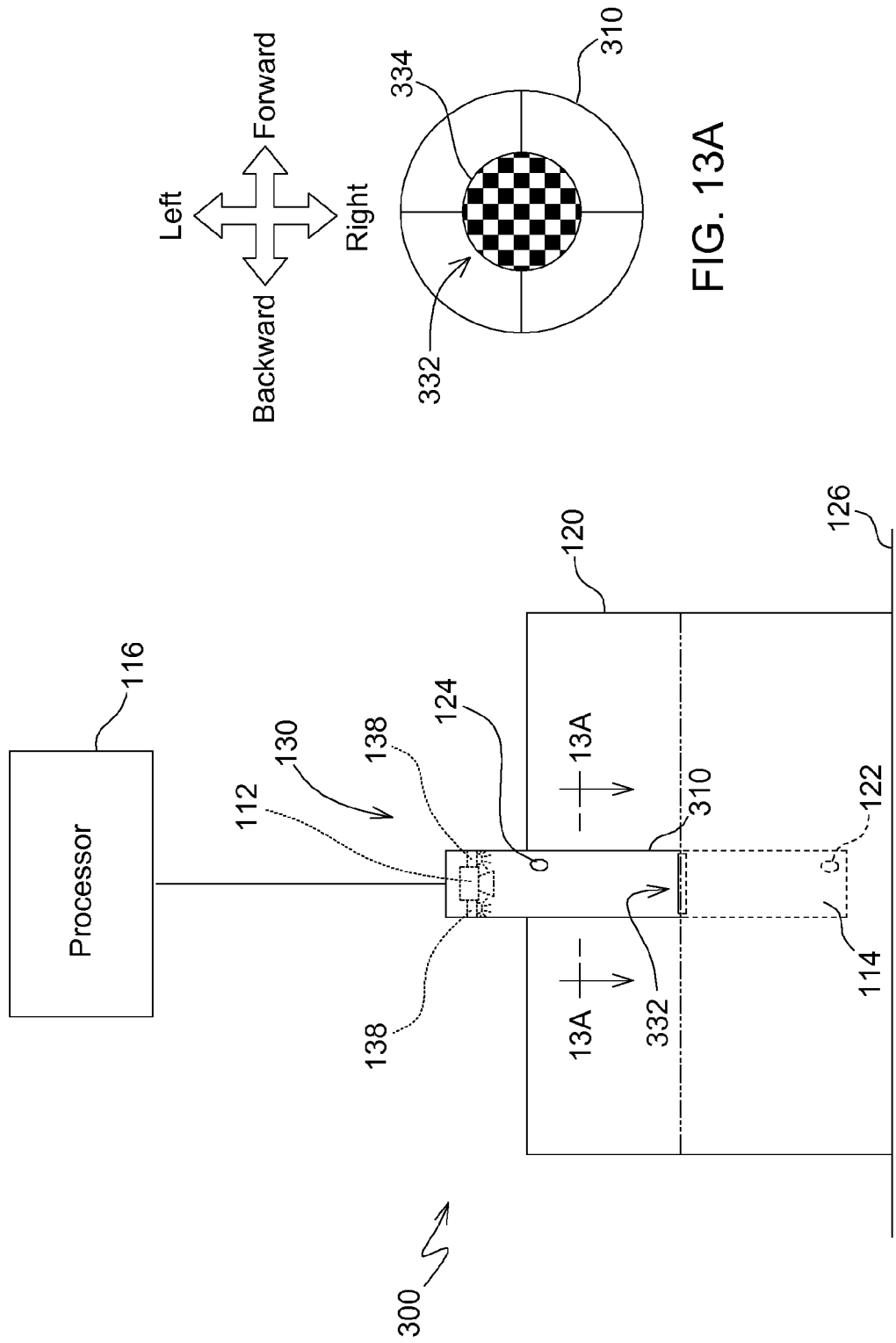

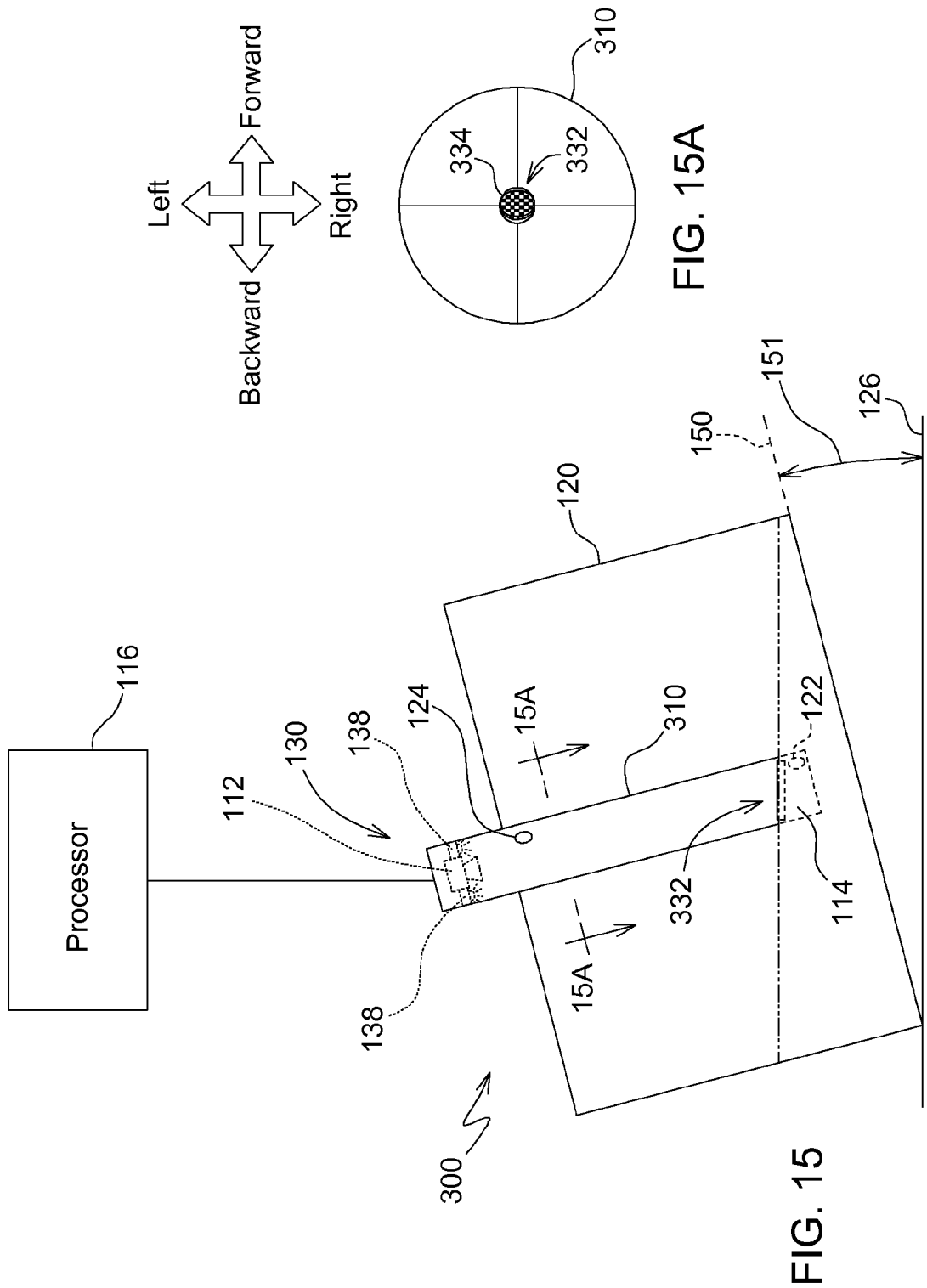

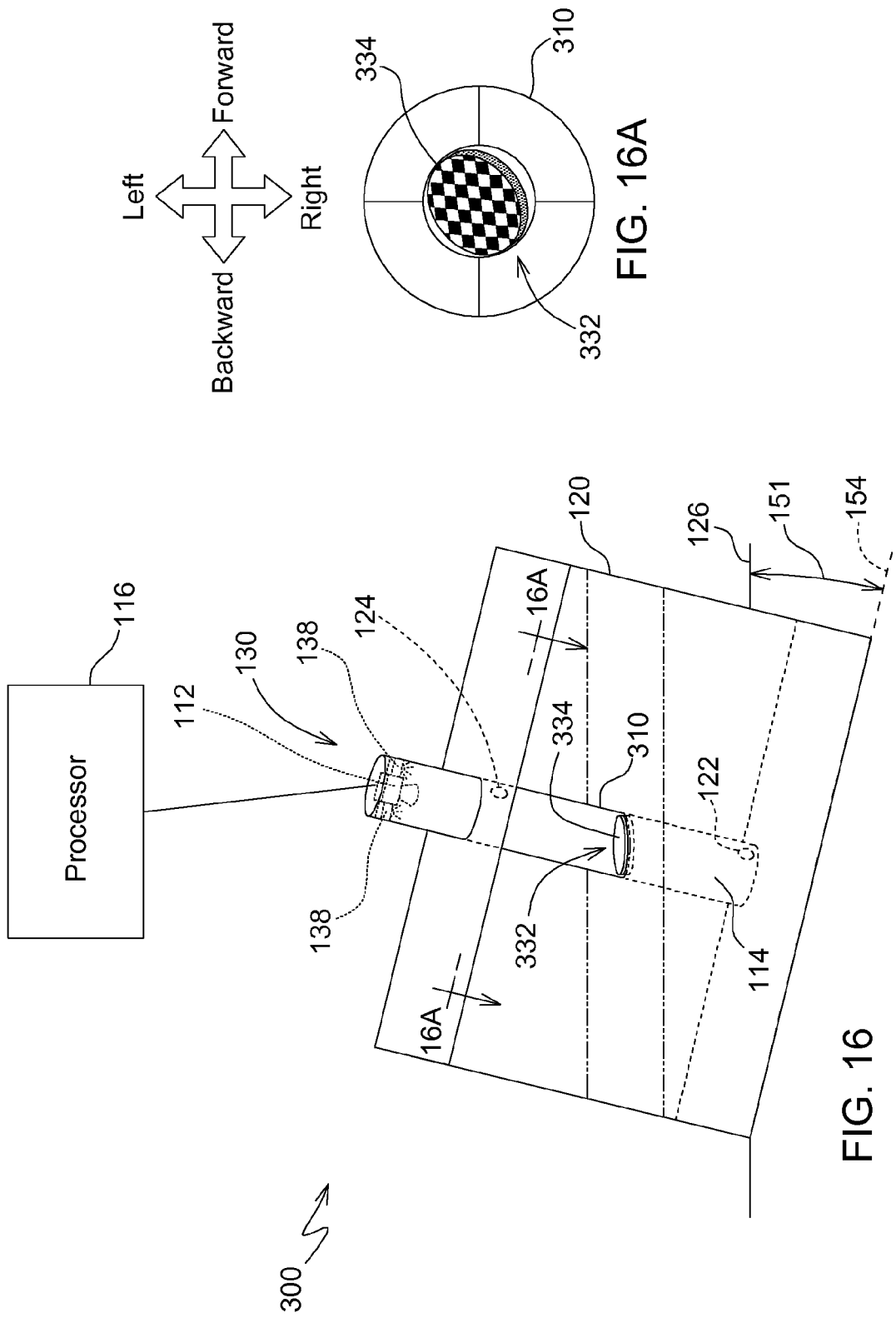

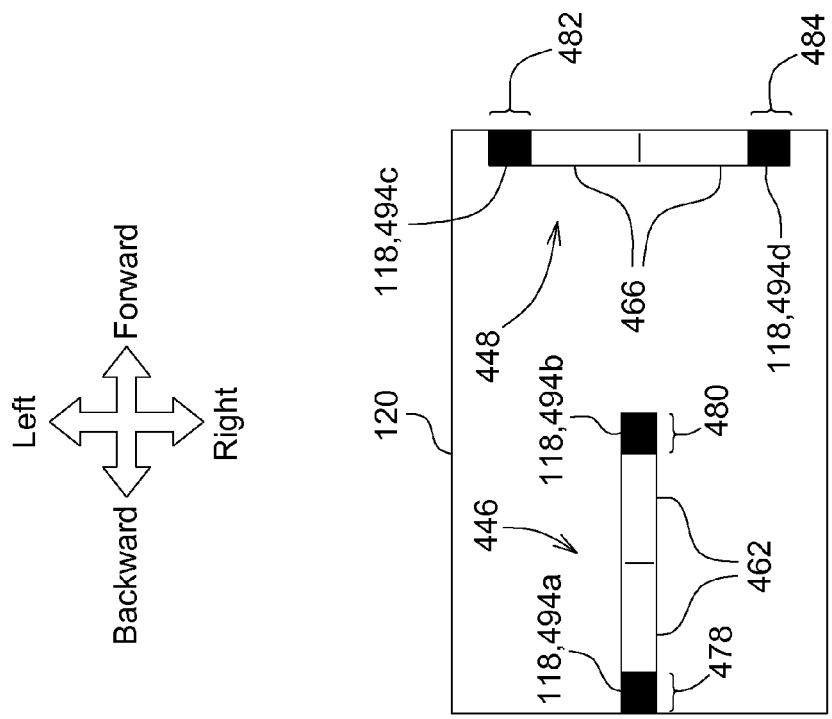
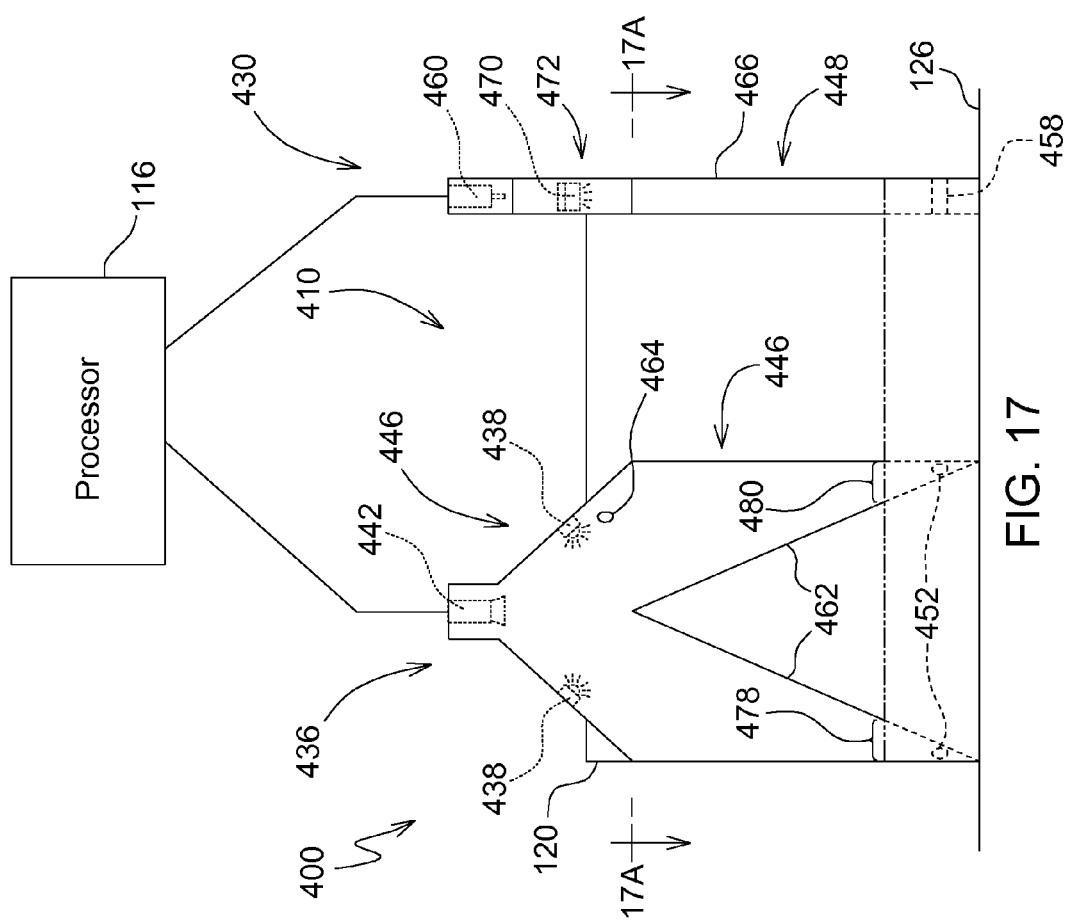

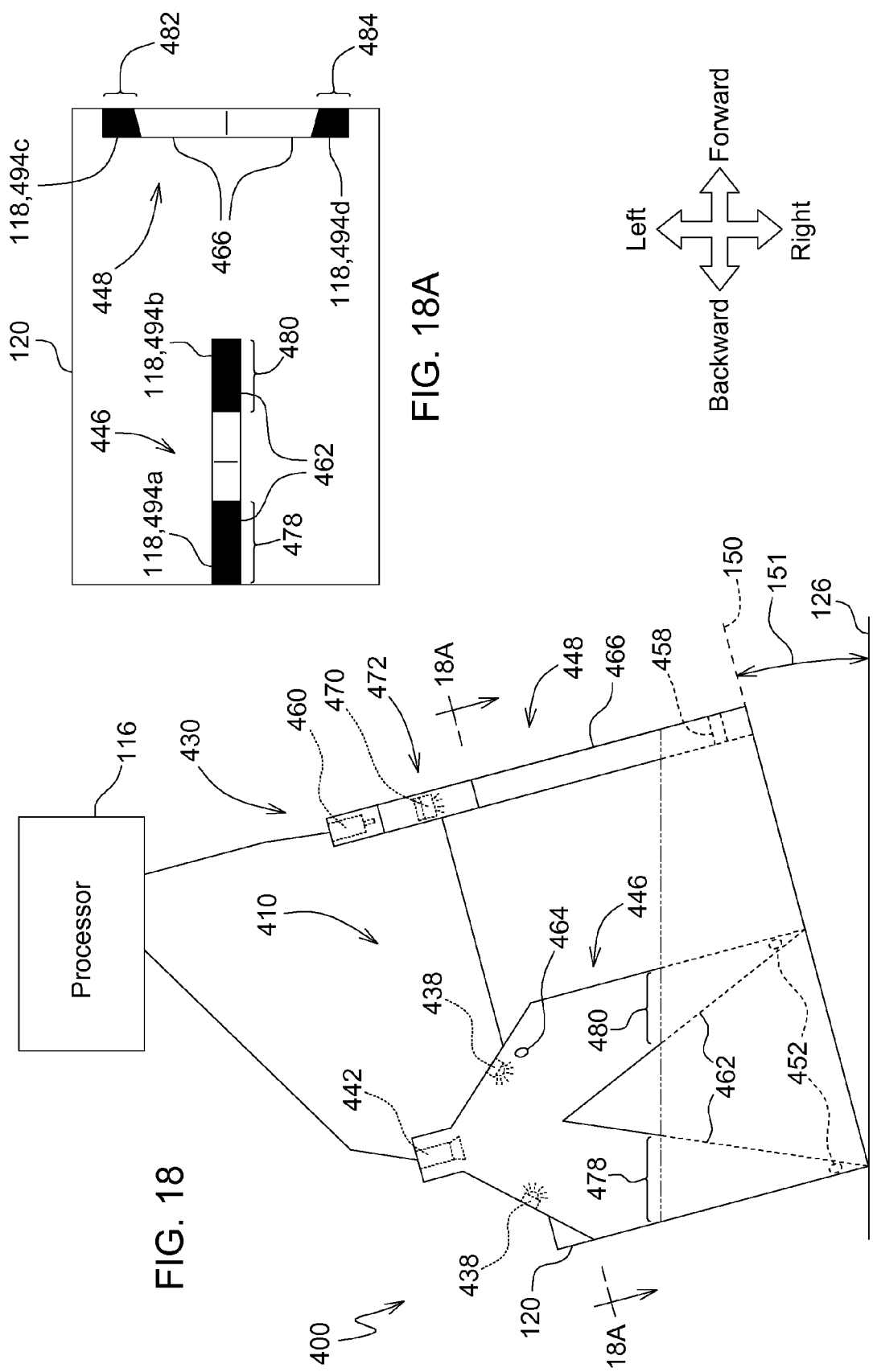

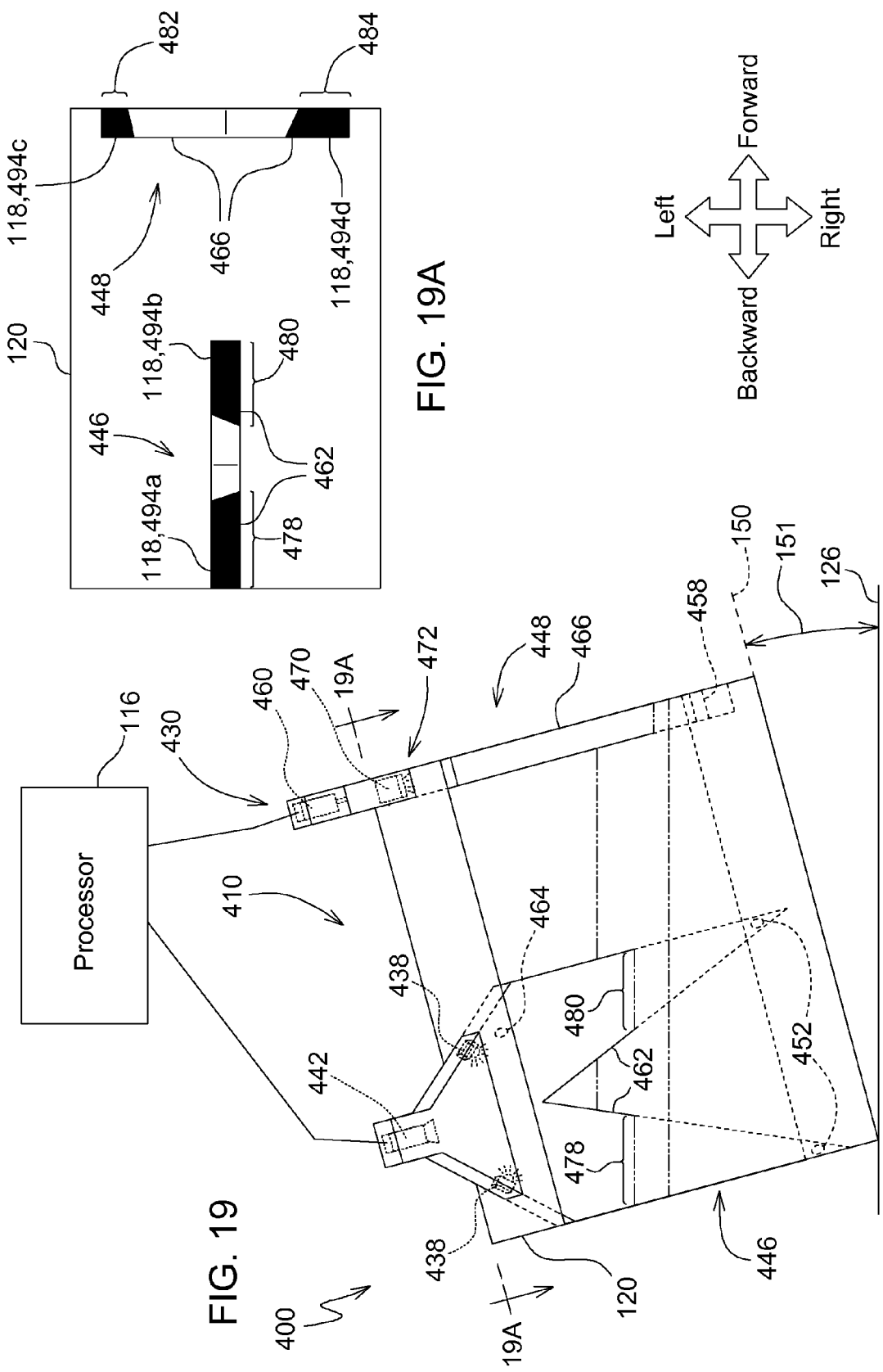

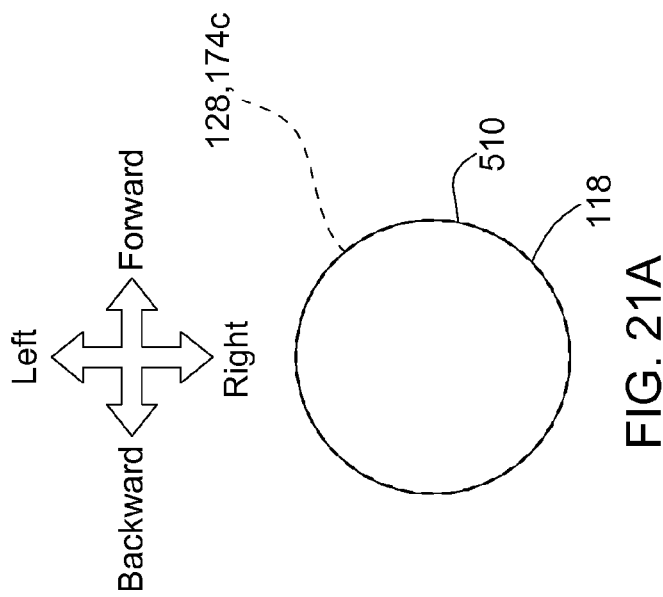
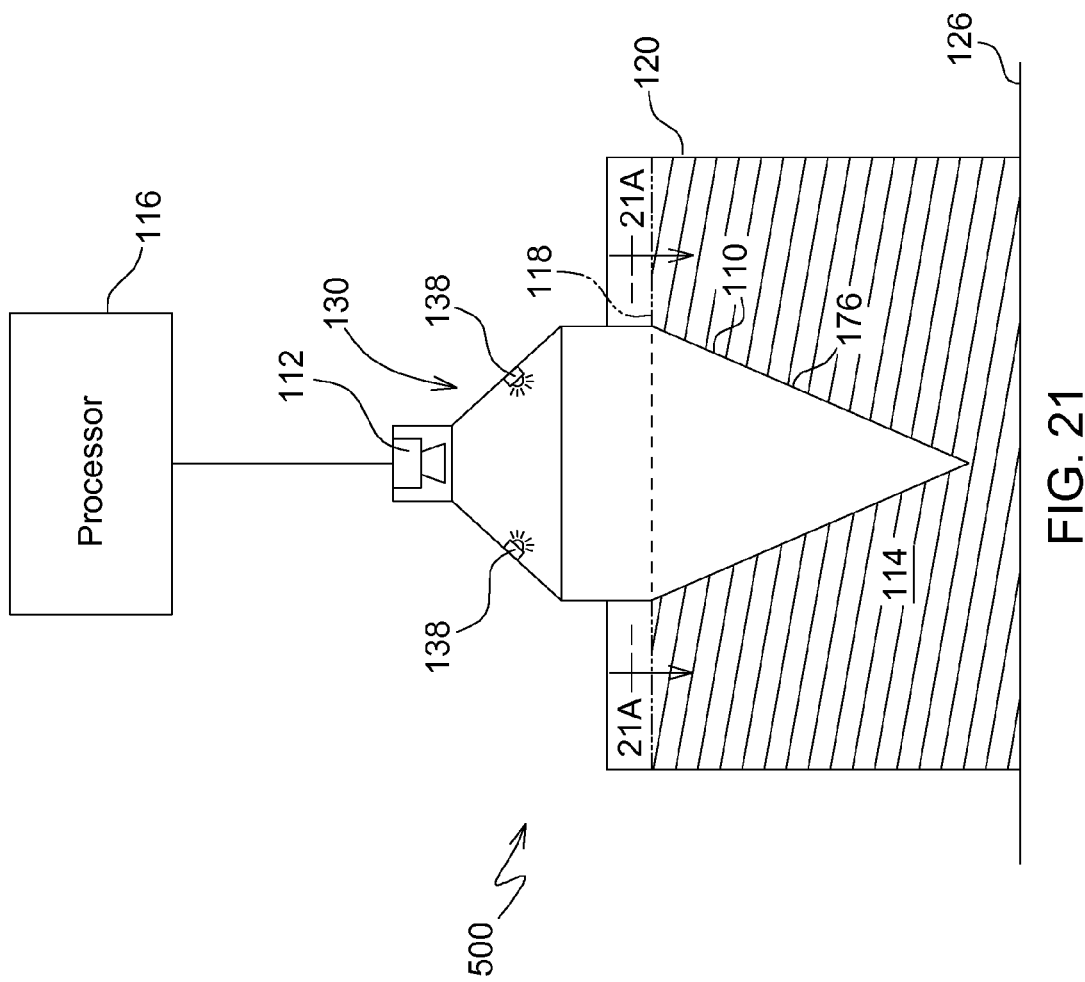

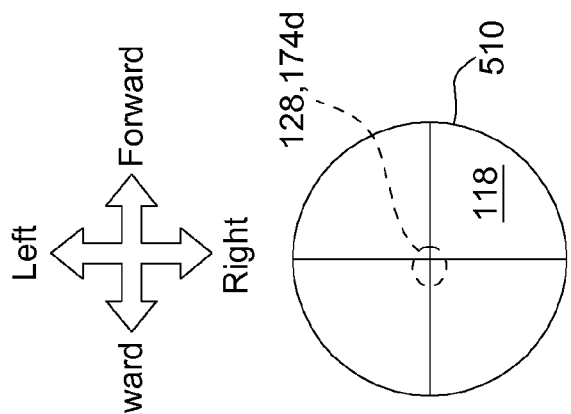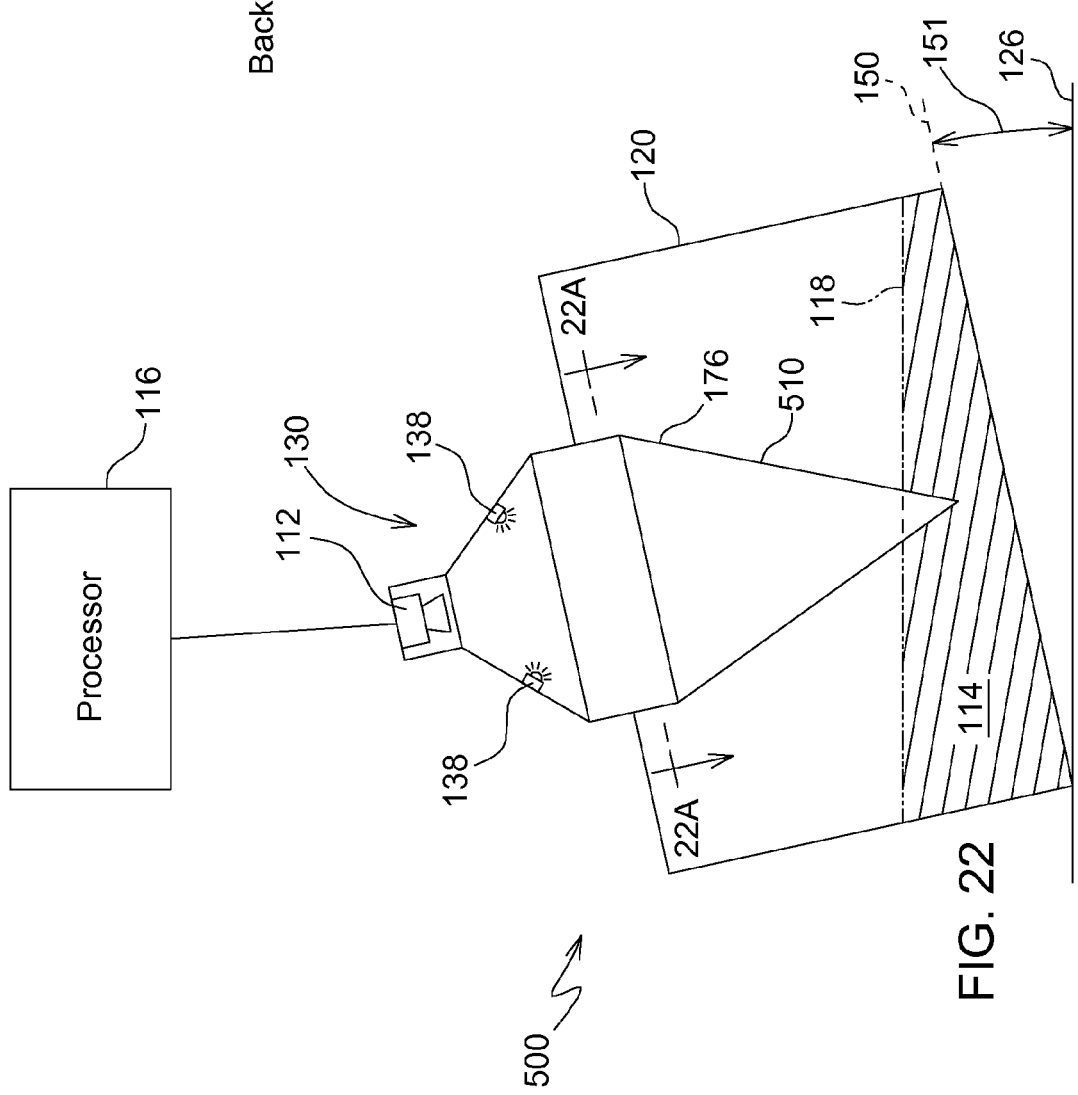

SYSTEM FOR DETERMINING A LIQUID QUANTITY AND ORIENTATION

FIELD OF THE DISCLOSURE

The present disclosure relates to a system for determining a liquid quantity and orientation.

BACKGROUND OF THE DISCLOSURE

The technology used in known liquid level sensors has issues limiting performance and reliability. For example, float level sensors can become lodged or lose buoyancy. As a further example, sonic "time of flight" sensors have an off axis range that is limited to an order of 30 degrees, and the variations in the fluid can affect the speed of sound through the fluid and, thus, the accuracy of the sensor. As a further example, capacitance level sensors can measure inaccurately as a result of variations in the fluid.

SUMMARY OF THE DISCLOSURE

Disclosed is a system having a vessel, an image capturing device, and a processor. The vessel is at least partially contact with a liquid, wherein the liquid has a liquid surface that is defined by a quantity of the liquid, a shape of the vessel, and an orientation of the vessel relative to a horizontal plane. The image capturing device is spaced apart from the liquid surface and captures an image thereof. The processor is in communication with the image capturing device for analyzing a characteristic of the image and for determining an attribute of the liquid therefrom.

BRIEF DESCRIPTION OF THE DRAWINGS

The detailed description of the drawings refers to the accompanying figures in which:

FIG. 1 is view of a machine having a first system for measuring at least of a quantity and an orientation of the liquid, the machine being shown in a level position;

FIG. 4 is schematic view of the first system in a level position and having a high level of liquid therein;

FIG. 4A is a top sectional view taken along lines 4A of FIG. 4, showing a top view of the first vessel and the liquid therein;

FIG. 5 is schematic view of the first system, in an upward position, having a low level of liquid therein;

FIG. 5A is a top sectional view taken along lines 5A of FIG. 5, showing a top view of the first vessel and the liquid therein;

FIG. 7 is schematic view of a second system being shown in a level position and having a low level of liquid therein;

FIG. 7A is a top sectional view taken along lines 7A of FIG. 7, showing a top view of a second vessel and the liquid therein;

FIG. 9 is a schematic view of the second system in a level position and having a high level of liquid therein;

FIG. 9A is a top sectional view taken along lines 9A of FIG. 9, showing a top view of the second vessel and the liquid therein;

FIG. 10 is a schematic view of the second system in an upward position and having a low level of liquid therein;

FIG. 10A is a top sectional view taken along lines 10A of FIG. 10, showing a top view of the second vessel and the liquid therein;

FIG. 11 is a schematic view of the second system in a downward and rightward position and having a medium level of liquid therein;

FIG. 11A is a top sectional view taken along lines 11A of FIG. 11, showing a top view of the second vessel and the liquid therein;

FIG. 13 is a schematic view of the third system in a level position and having a medium level of liquid therein;

FIG. 13A is a top sectional view taken along lines 13A of FIG. 13, showing a top view of the third vessel and the liquid therein;

FIG. 15 is a schematic view of the third system in an upward position and having a low level of liquid therein;

FIG. 15A is a top sectional view taken along lines 15A of FIG. 15, showing a top view of the third vessel and the liquid therein;

FIG. 16 is a schematic view of the third system, in a downward and slightly rightward position, having a medium level of liquid therein;

FIG. 16A is a top sectional view taken along lines 16A of FIG. 16, showing a top view of the third vessel and the liquid therein;

FIG. 17 is a schematic view of a fourth system being shown in a level position and having a low level of liquid therein;

FIG. 17A is a top sectional view taken along lines 17A of FIG. 17, showing a top view of a fourth vessel and the liquid therein;

FIG. 18 is a schematic view of the fourth system, the system being shown in an upward position and having a medium level of liquid therein;

FIG. 18A is a top sectional view taken along lines 18A of FIG. 18, showing a top view of the fourth vessel and the liquid therein;

FIG. 19 is a schematic view of the fourth system, the system being shown, in a downward and slightly rightward position, having a medium level of liquid therein;

FIG. 19A is a top sectional view taken along lines 19A of FIG. 19, showing a top view of the fourth vessel and the liquid therein

FIG. 21 is a schematic view of the fifth system, the system being shown, in a level position, having a high level of liquid therein;

FIG. 21A is a top sectional view taken along lines 21A of FIG. 21, showing a top view of the fifth vessel and the liquid therein;

FIG. 22 is a schematic view of the fifth system, the system being shown, in an upward position, having a low level of liquid therein;

FIG. 22A is a top sectional view taken along lines 22A of FIG. 22, showing a top view of the fifth vessel and the liquid therein;

DETAILED DESCRIPTION OF THE DRAWINGS

Figure 2A:
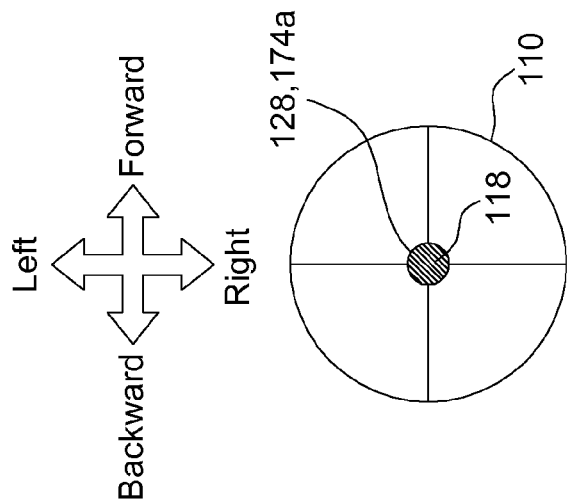
FIG. 2A is a top sectional view taken along lines 2A of FIG. 2, showing a top view of a first vessel and the liquid therein.

Referring to FIG. 1, there is shown a machine 106 having a first system 100 for measuring at least one of a quantity and an orientation of a liquid 114, as shown in the other FIGS. The machine 106 is shown in a level position on a horizontal plane 126. The machine 106 may be, for example, an agricultural tractor (as illustrated), a construction machine, an automobile, a truck, a gen-set or any other kind of machine having a liquid thereon. The liquid 114 may be, for example, fuel (such as gasoline or diesel fuel), coolant, lubricant, diesel exhaust fluid or any other kind of fluid on a machine. Shown above the horizontal plane 126 is an uphill plane 150 spaced apart therefrom by an uphill angle 151. In contrast, shown below the horizontal plane 126 is a downhill plane 154 spaced apart from therefrom by a downhill angle 155. The uphill plane 150 and downhill plane 154 symbolize the machine 106 being positioned uphill and downhill, respectively. For example, if the machine 106 is travelling uphill on a work sight or field, for example, then the machine 106 is positioned uphill.

Figure 2:
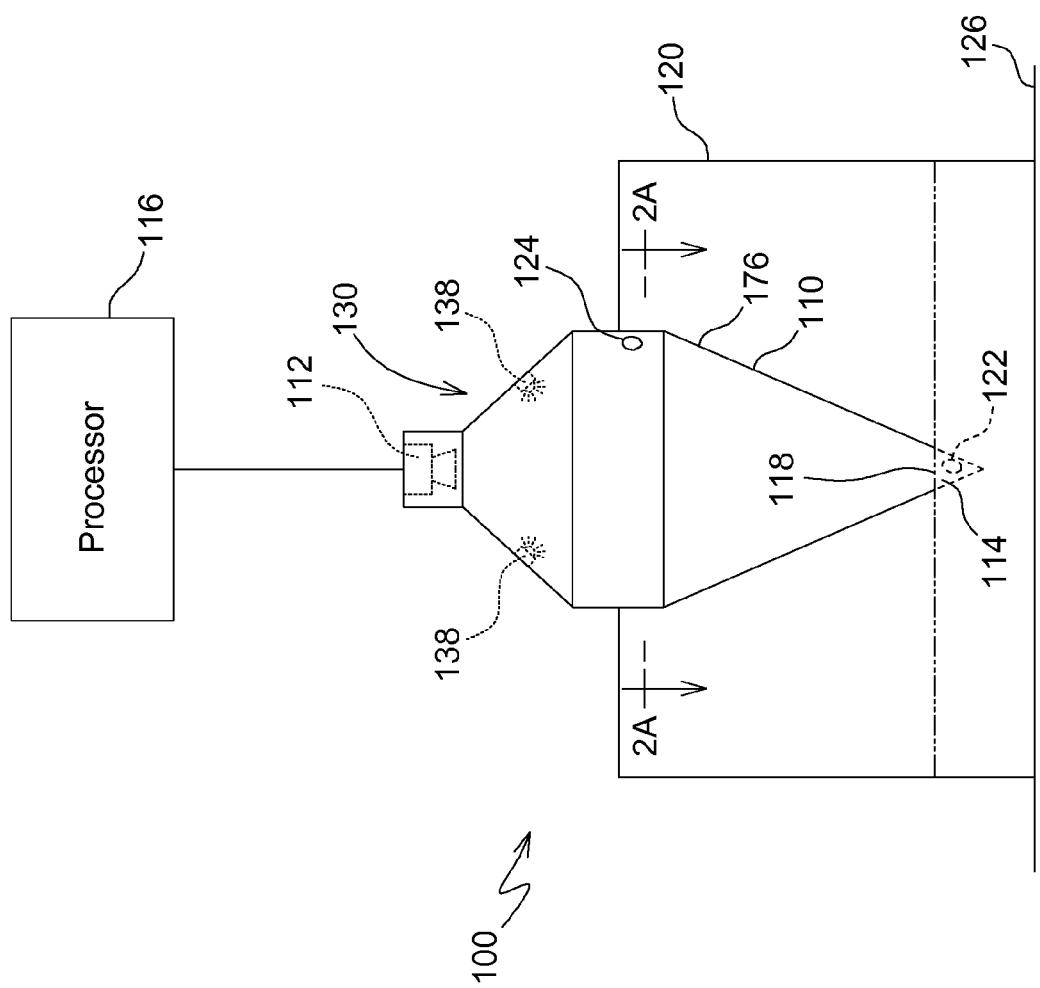
FIG. 2 is schematic view of the first system being shown in a level position and having a low level of liquid therein.

Next, referring to FIG. 2, there is schematic view of the first system 100 being shown in a level position and having a low level of liquid 114 therein. FIG. 2A is a top sectional view taken along lines 2A of FIG. 2, illustrating a top view of a first vessel 110 and the liquid 114 therein. The first system 100 includes the first vessel 110, an image capturing device 112, and a processor 116. In this embodiment, the first vessel 110 may contact the liquid 114. The liquid 114 has a liquid surface 118 that is defined by a quantity of the liquid 114 in the first vessel 110, a shape of the first vessel 110, and an orientation of the first vessel 110 relative to a horizontal plane 126.

The image capturing device 112, such as a camera or a linear image sensor, is spaced apart from the liquid surface 118 for capturing an image thereof. A light source 130 is positioned so as to illuminate and enhance the image being captured by the image capturing device 112. The light source 130 is shown having a pair of light elements 138. The light source 130 may take a variety of different forms, including having greater or fewer light elements 138. Further, for example, the light source 130 may be an incandescent light, a halogen light, a fluorescent light, or an LED light. In the embodiment shown, the image capturing device 112 is positioned in the first vessel 110.

The processor 116 is in communication with the image capturing device 112 for analyzing a characteristic of the image and for determining an attribute of the liquid 114. The attribute of the liquid 114 may be, for example, the quantity of the liquid 114. To illustrate, if the liquid 114 is a fuel, the quantity of the liquid 114 indicates how much longer the machine 106 may operate for the given quantity thereof, and it also indicates when additional fuel may need to be added to the machine 106. Additionally, the attribute of the liquid 114 may also be an orientation of the liquid surface 118 relative to the first vessel 110, and in such an embodiment, the processor 116 may determine an orientation of the machine 106 relative to the horizontal plane 126 based on the orientation of the liquid surface 118 relative to the first vessel 110. Knowing the orientation of the machine 106 may be useful for knowing, for example, when and how to shift a transmission (not shown) of the machine 106, and may be useful for knowing how much power must be produced for the machine 106 to operate effectively.

The first vessel 110 has a first opening 122 and a second opening 124. The first opening 122 is positioned so as to allow the liquid 114 to enter and exit the first vessel 110 depending on the quantity of the liquid 114 in the first vessel 110 and the orientation thereof relative to the horizontal plane 126. For example, as the quantity of the liquid 114 increases (e.g., a fill up or a changing orientation of the machine 106), the liquid 114 enters through the first opening 122. Further, the second opening 124 is positioned so as to allow a gas in the first vessel 110 to enter and exit therefrom, depending on the quantity of the liquid 114 in the first vessel 110 and the orientation of the first vessel 110 relative to the horizontal plane 126. For example, as the quantity of the liquid 114 in the first vessel 110 increases (e.g., a fill up or a changing orientation of the machine 106), the gas exits through the second opening 124. In other embodiments, the first vessel 110 may be made of, for example, a mesh or any other surface allowing the gas and liquid 114 to enter and exit therefrom. Additionally, the first vessel 110 is shown having a cone shaped portion 176, but in other embodiments, the first vessel 110 may be pyramid shaped, hemispherically shaped, frustum shaped, irregularly shaped, or pentagonal shaped, to name a few examples. In some embodiments, the first vessel 110 may also act as a stand-alone tank for the liquid 114 (i.e., the only tank).

An intersection of the liquid surface 118 and the first vessel 110 defines a uniquely positioned sectional periphery 128. In this embodiment, the intersection of the liquid surface 118 and the first vessel 110, as viewed by the image capturing device 112, is on an outside side of the first vessel 110. The characteristic of the image of the liquid surface 118 is the uniquely positioned sectional periphery 128, the first vessel 110 is configured such that the uniquely positioned sectional periphery 128 varies between a plurality of uniquely positioned sectional peripheries 174 (e.g., 174a-174e). Each of the plurality of uniquely positioned sectional peripheries 174 (e.g., 174a-174e), as viewed by the image capturing device 112, is the only sectional periphery 128 for a given combination of the quantity of the liquid 114 in the first vessel 110 and the orientation of the liquid surface 118 relative to the first vessel 110. As illustrated in FIG. 2, for example, a first uniquely positioned sectional periphery 174*a* indicates that the first system 100 is being shown in a level position and having a low level of liquid 114 therein. The first uniquely positioned sectional periphery 174*a* has a unique size (small), shape (circular), and orientation (centered), which in combination are indicative of the first system 100 being shown in the level position and having a low level of liquid 114 therein, as just discussed.

Figure 3A:
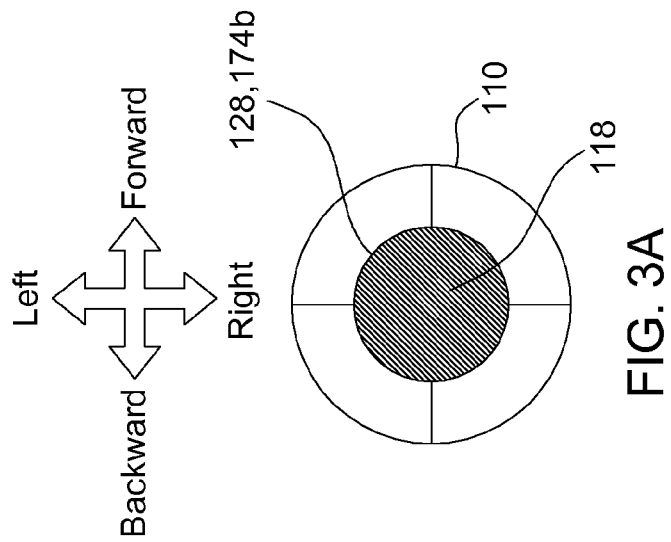
FIG. 3A is a top sectional view taken along lines 3A of FIG. 3, showing a top view of the first vessel and the liquid therein.
Figure 3:
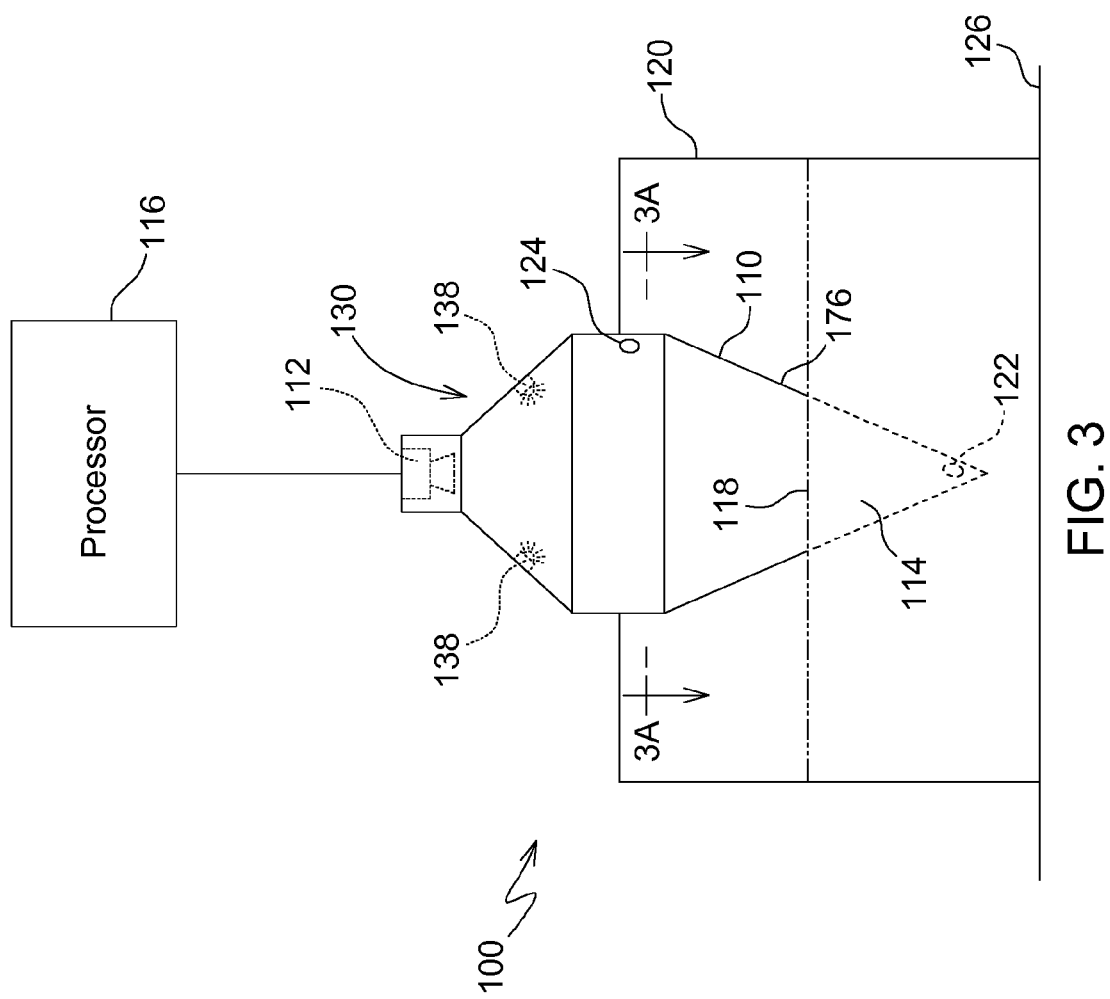
FIG. 3 is schematic view of the first system in a level position and having a medium level of liquid therein.

Next, referring to FIG. 3, there is shown schematic view of the first system 100 in a level position and having a medium level of liquid 114 therein, and further, FIG. 3A is a top sectional view taken along lines 3A of FIG. 3, illustrating a top view of the first vessel 110 and liquid 114 therein. In FIG. 3*a*, a second uniquely positioned sectional periphery 174*b* has a unique size (medium), shape (circular), and orientation (centered) as viewed by the image capturing device 112. In combination, this is indicative of the first system 100 being in the level position and having a medium level of liquid 114 therein.

Referring to FIG. 4, there is shown a schematic view of the first system 100 in a level position and having a high level of liquid 114 therein, and further, FIG. 4A is a top sectional view taken along lines 4A of FIG. 4, illustrating a top view of the first vessel 110 and the liquid 114 therein. In FIG. 4*a*, a third uniquely positioned sectional periphery 174*c* has a unique size (large), shape (circular), and orientation (centered) as viewed by the image capturing device 112. In combination, this is indicative of the first system 100 being in the level position and having a high level of liquid 114 therein.

Referring to FIG. 5, there is shown a schematic view of the first system 100, in an upward position and having a low level of liquid 114 therein, and further, FIG. 5A is a top sectional view taken along lines 5A of FIG. 5, illustrating a top view of the first vessel 110 and the liquid 114 therein. In FIG. 5*a*, a fourth uniquely positioned sectional periphery 174*d* has a unique size (small), shape (oblong), and orientation (slightly backward) as viewed by the image capturing device 112. In combination, this is indicative of the first system 100 being in the upward position and having a low level of liquid 114 therein.

Figure 6A:
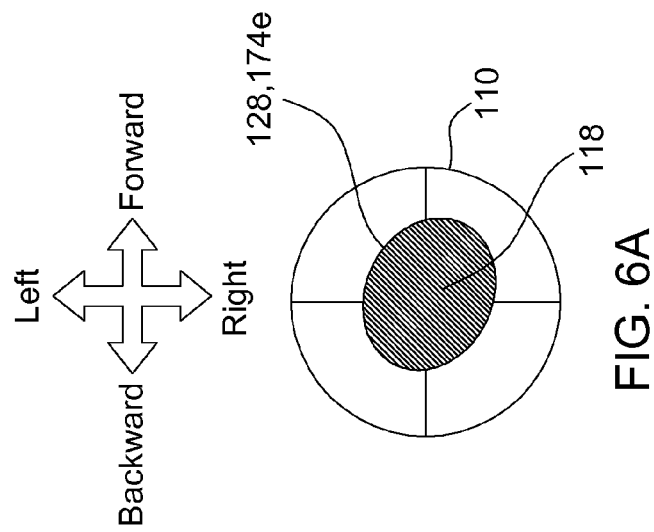
FIG. 6A is a top sectional view taken along lines 6A of FIG. 6, showing a top view of the first vessel and the liquid therein.
Figure 6:
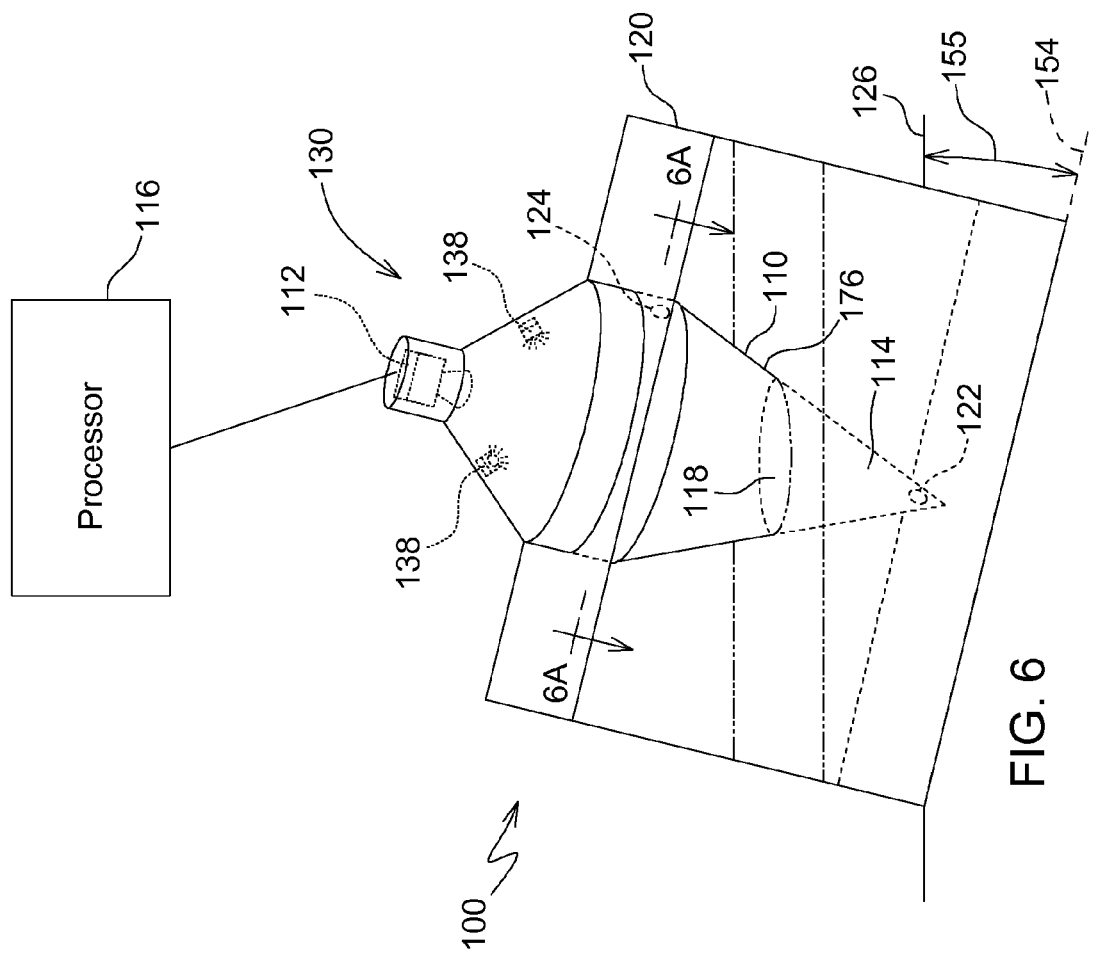
FIG. 6 is schematic view of the first system, in a downward and rightward position, having a medium level of liquid therein.

Referring to FIG. 6, there is shown a schematic view of the first system 100, in a downward and rightward position, having a medium level of liquid 114 therein, and further, FIG. 6A is a top sectional view taken along lines 6A of FIG. 6, illustrating a top view of the first vessel 110 and the liquid 114 therein. In FIG. 6*a*, a fifth uniquely positioned sectional periphery 174*e* has a unique size (medium), shape (oblong), and orientation (slightly forward and slightly to the right) as viewed by the image capturing device 112. In combination, this is indicative of the first system 100 being in the downward and rightward position and having a medium level of liquid 114 therein.

Referring to FIG. 7, there is shown a schematic view of a second system 200 for determining at least one of the quantity and the orientation of the liquid 114. In FIG. 7, the second system 200 is shown in a level position and having a low level of liquid 114. FIG. 7A is a top sectional view taken along lines 7A of FIG. 7, illustrating a top view of a second vessel 210 and the liquid 114 therein. FIGS. 7 and 7A have several components similar in structure and function as those shown in FIGS. 2-5, as indicated by the use of identical reference numerals where applicable. Likewise, identical reference numerals are used in other FIGS., too.

The second system 200 includes an inner structure 240 surrounded by the second vessel 210. The inner structure 240 and the second vessel 210 cooperate so as to define an inner vessel 244, and the liquid 114 is positioned therein. An intersection of the liquid surface 118 and the inner vessel 224 defines a uniquely positioned sectional periphery 128, and in such an embodiment, the characteristic of the image of the liquid surface 118 is the uniquely positioned sectional periphery 128. The inner vessel 224 is configured such that the uniquely positioned sectional periphery 128 varies between a plurality of uniquely positioned sectional peripheries 174 (e.g., 174*f*-174*j*). Each of the plurality of uniquely positioned sectional peripheries 174 (e.g., 174*f*-174*j*), as viewed by the image capturing device 112, is the only sectional periphery 128 for a given combination of the quantity of the liquid 114 in the inner vessel 224 and an orientation of the liquid surface 118 relative to the second vessel 210. In FIG. 7*a*, a seventh uniquely positioned sectional periphery 174*f* has a unique size (small), shape (cross shaped), and orientation (centered) as viewed by the image capturing device 112. In combination, this is indicative of the second system 200 being in the level position and having a low level of liquid 114 therein.

Figure 8A:
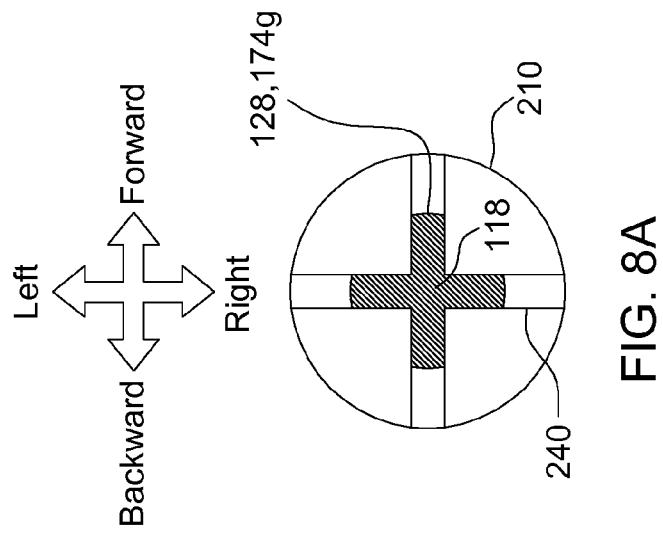
FIG. 8A is a top sectional view taken along lines 8A of FIG. 8, showing a top view of the second vessel and the liquid therein.
Figure 8:
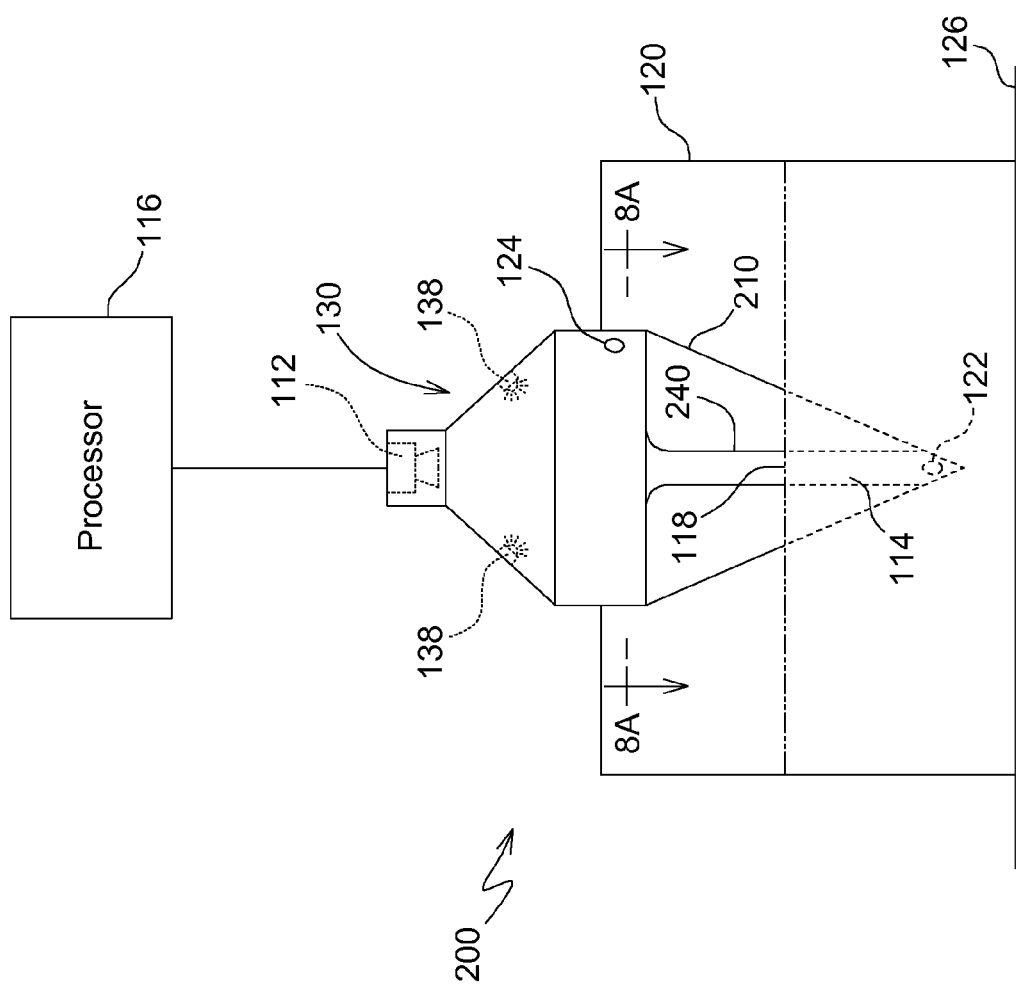
FIG. 8 is schematic view of the second system in a level position and having a medium level of liquid therein.

FIG. 8 is schematic view of the second system 200 in a level position and having a medium level of liquid 114 therein, and further, FIG. 8A is a top sectional view taken along lines 8A of FIG. 8, illustrating a top view of the second vessel 210 and the liquid 114 therein. In FIG. 8*a*, a seventh uniquely positioned sectional periphery 174*g* has a unique size (medium), shape (cross shaped), and orientation (centered) as viewed by the image capturing device 112. In combination, this is indicative of the second system 200 being in the level position and having a medium level of liquid 114 therein.

FIG. 9 is a schematic view of the second system 200 in a level position and having a high level of liquid 114 therein, and further, FIG. 9A is a top sectional view taken along lines 9A of FIG. 9, illustrating a top view of the second vessel 210 and the liquid 114 therein. In FIG. 9*a*, an eighth uniquely positioned sectional periphery 174*h* has a unique size (large), shape (cross shaped), and orientation (centered) as viewed by the image capturing device 112. In combination, this indicative of the second system 200 being in the level position and having a high level of liquid 114 therein.

FIG. 10 is a schematic view of the second system 200 in an upward position and having a low level of liquid 114 therein, and further, FIG. 10A is a top sectional view taken along lines 10A of FIG. 10, illustrating a top view of the second vessel 210 and the liquid 114 therein. In FIG. 10*a*, a ninth uniquely positioned sectional periphery 174*i* has a unique size (small), shape (cross shaped), and orientation (slightly backward) as viewed by the image capturing device 112. In combination, this is indicative of the second system 200 being in the upward position and having a low level of liquid 114 therein.

FIG. 11 is a schematic view of the second system 200 in a downward and rightward position and having a medium level of liquid 114 therein, and further, FIG. 11A is a top sectional view taken along lines 11A of FIG. 11, illustrating a top view of the second vessel 210 and the liquid 114 therein. In FIG. 11*a*, a tenth uniquely positioned sectional periphery 174*j* has a unique size (medium), shape (cross shaped), and orientation (slightly forward and slightly rightward) as viewed by the image capturing device 112. In combination, this is indicative of the second system 200 being in the downward and rightward position and having a medium level of liquid 114 therein.

Figure 12A:
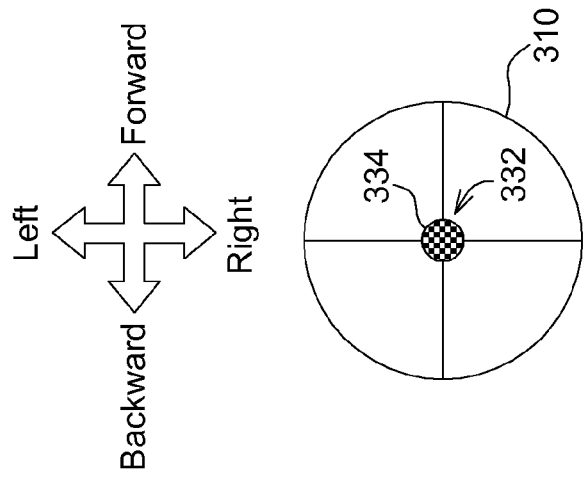
FIG. 12A is a top sectional view taken along lines 12A of FIG. 12, showing a top view of a third vessel and the liquid therein.
Figure 12:
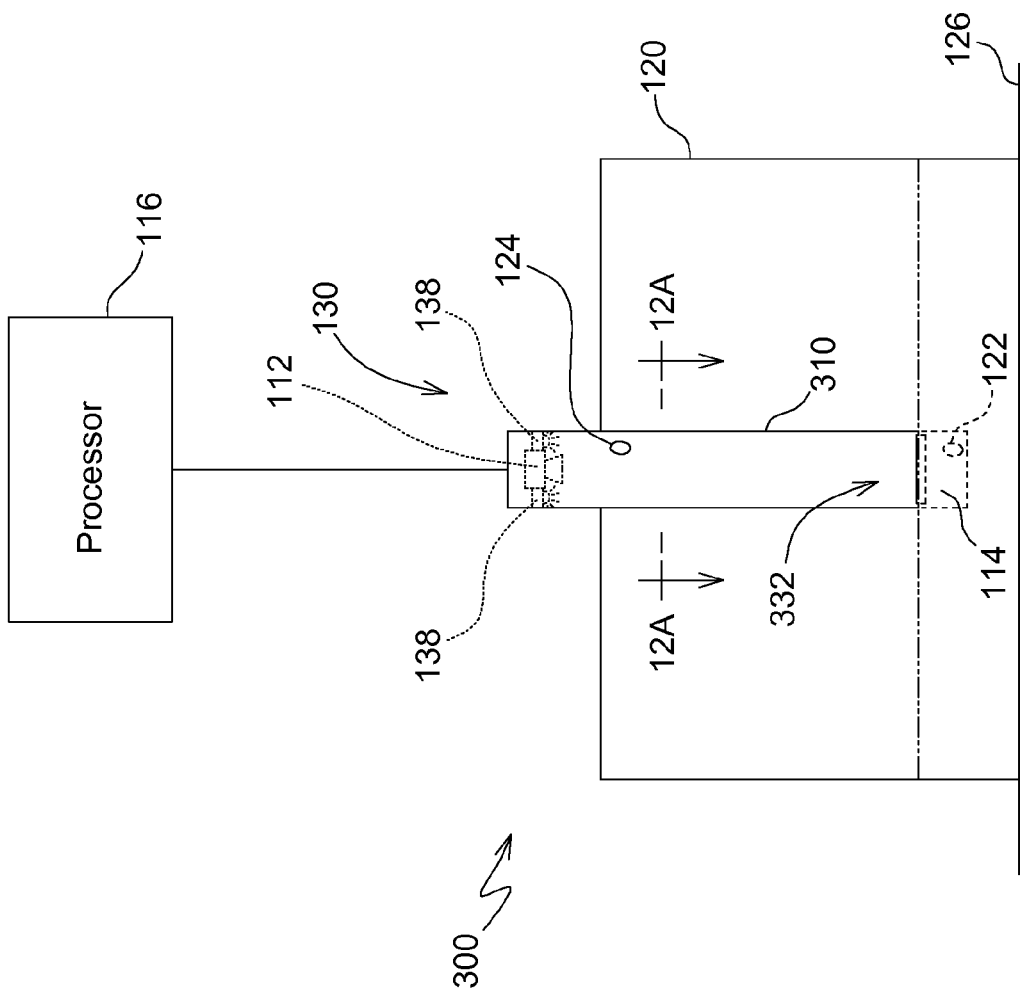
FIG. 12 is a schematic view of a third system being shown in a level position and having a low level of liquid therein.

FIG. 12 is a schematic view of a third system 300 for determining at least one of a quantity and orientation of the liquid 114, the third system 300 being shown in a level position and having a low level of liquid 114. Additionally, FIG. 12A is a top sectional view taken along lines 12A of FIG. 12, illustrating a top view of a third vessel 310 and the liquid 114 therein.

The third system 300 comprises a third vessel 310, a liquid float 332, an image capturing device 112, and a processor 116. The third vessel 310 at least partially surrounds the liquid 114, wherein the liquid 114 has a liquid surface 118 that is defined by a quantity of the liquid 114 in the third vessel 310, a shape of the third vessel 310, and an orientation of the third vessel 310 relative to the horizontal plane 126. The liquid float 332 rests upon the liquid surface 118. The image capturing device 112, which is spaced apart from the liquid float 332, captures an image of the liquid float 332. The image capturing device 112 may be a camera or a linear image sensor, for example. The processor 116 is in communication with the image capturing device 112 for analyzing a characteristic of the image of the liquid float 332 so as to determine an attribute of the liquid 114. The characteristic of the image may be an indicia 334 of the liquid float 332.

The attribute of the liquid 114 may be, for example, a level of the liquid 114 (i.e., quantity of liquid 114), and in such an embodiment, the processor 116 may analyze the indicia 334 so as to determine the level of the liquid 114. The attribute may additionally or alternatively be an orientation of the liquid surface 118 relative to the third vessel 310. The processor 116 analyzes the indicia 334 so as to determine the orientation of the liquid surface 118 relative to the third vessel 310, and to determine an orientation of a machine 106 relative to the horizontal plane 126 based on the orientation of the liquid surface 118 and liquid float 332 relative to the third vessel 310. The attribute of the liquid 114 may additionally or alternatively be an orientation of the liquid surface 118 relative to the third vessel 310. In such an embodiment, the processor 116 analyzes the liquid float 332 so as to determine the orientation of the liquid surface 118 relative to the third vessel 310, and determine an orientation of the machine 106 relative to the horizontal plane 126 based on the orientation of the liquid surface 118 relative to the third vessel 310.

In FIG. 12a, the liquid float 332 has a unique size (small), shape (round), and orientation of the indicia 334 (square) as viewed by the image capturing device 112. In combination, this is indicative of the third system 300 being in the level position and having a low level of liquid 114 therein. In fact, in FIG. 12a, the indicia 334, as viewed by the image capturing device 112, may be indicative of the third system 300 being in this position. For example, the size and shapes of the indicia 334 are unique to each position of the machine 106 and the level of the liquid 114. As illustrated, the indicia 334 is a checker pattern, the checker pattern, as viewed by the image capturing device 112, varies in the size of the checker pattern, the orientation of the checker pattern, and the length and height of each individual checker of the checker pattern. Additionally, although the indicia 334 is shown as a checker pattern, the indicia 334 can take various other sizes, shapes, and patterns, depending on the specific application and needs of the third system 300.

FIG. 13 is a schematic view of the third system 300 in a level position and having a medium level of liquid 114 therein, and further, FIG. 13A is a top sectional view taken along lines 13A of FIG. 13, illustrating a top view of the third vessel 310 and the liquid 114 therein. In FIG. 13a, the liquid float 332 has a unique size (medium), shape (round), and orientation of the indicia 334 (square) as viewed by the image capturing device 112. In combination, this is indicative of the third system 300 being in the level position and having a medium level of liquid 114 therein.

Figure 14A:
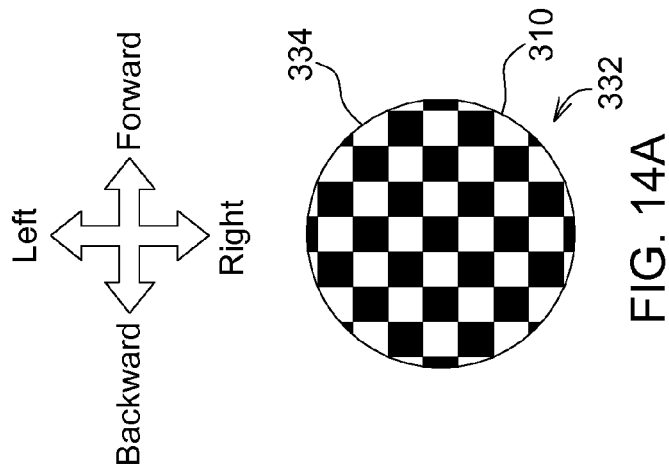
FIG. 14A is a top sectional view taken along lines 14A of FIG. 14, showing a top view of the third vessel and the liquid therein.
Figure 14:
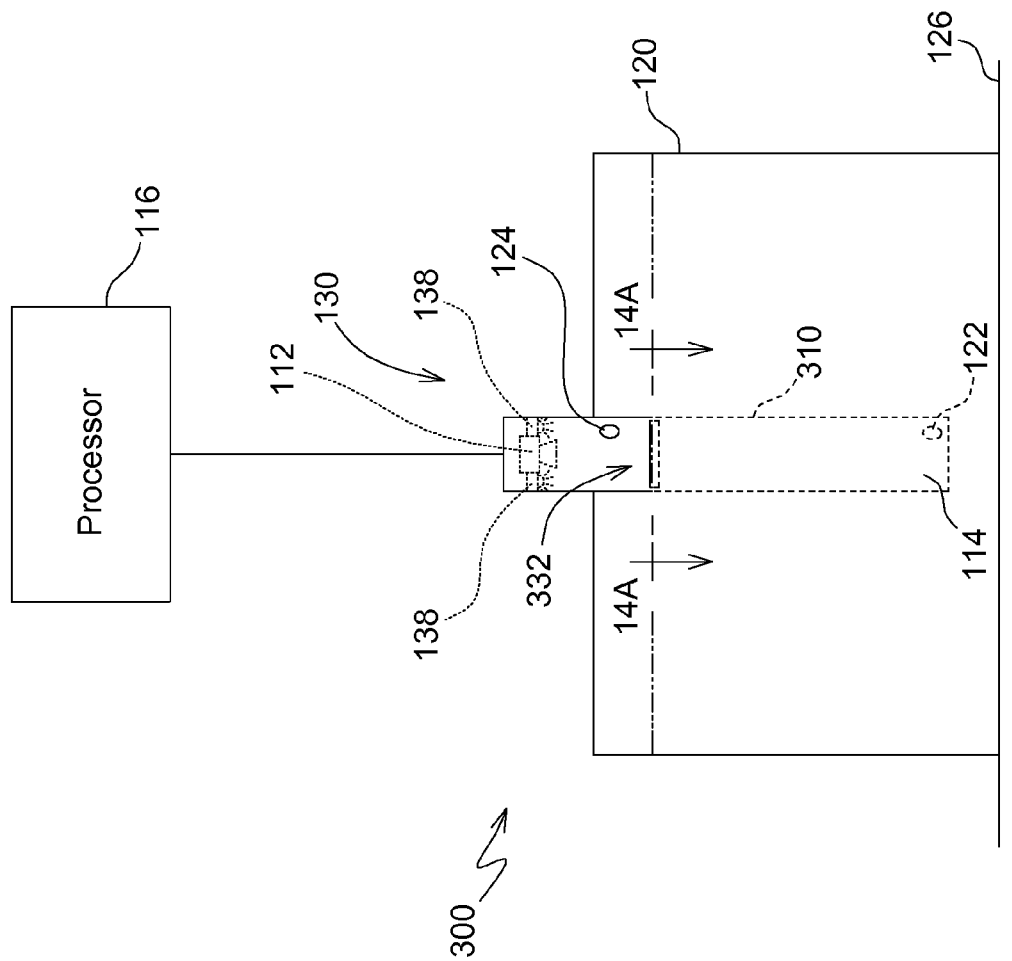
FIG. 14 is a schematic view of the third system in a level position and having a high level of liquid therein.

FIG. 14 is a schematic view of the third system 300 in a level position and having a high level of liquid 114 therein, and further, FIG. 14A is a top sectional view taken along lines 14A of FIG. 14, illustrating a top view of the third vessel 310 and the liquid 114 therein. In FIG. 14a, the liquid float 332 has a unique size (large), shape (round), and orientation of the indicia 334 (square) as viewed by the image capturing device 112. In combination, this is indicative of the third system 300 being in the level position and having a high level of liquid 114 therein.

FIG. 15 is a schematic view of the third system 300 in an upward position and having a low level of liquid 114 therein, and further, FIG. 15A is a top sectional view taken along lines 15A of FIG. 15, illustrating a top view of the third vessel 310 and the liquid 114 therein. In FIG. 15a, the liquid float 332 has a unique size (oblong), shape (small), and orientation of the indicia 334 (out of square) as viewed by the image capturing device 112. In combination, this is indicative of the third system 300 being in the upward position and having a low level of liquid 114 therein.

FIG. 16 is a schematic view of the third system 300, in a downward and slightly rightward position, having a low level of liquid 114 therein. Additionally, FIG. 16A is a top sectional view taken along lines 16A of FIG. 16, illustrating a top view of the third vessel 310 and the liquid 114 therein. In FIG. 16a, the liquid float 332 has a unique size (medium), shape (oblong), and orientation of the indicia 334 (out of square) as viewed by the image capturing device 112. In combination, this is indicative of the third system 300 being in the downward and slightly rightward position and having a low level of liquid 114 therein.

FIG. 17 is a schematic view of a fourth system 400 for determining at least one of a quantity and an orientation of the liquid 114, the fourth system 400 being shown in a level position and having a low level of liquid 114 therein. And FIG. 17A is a top sectional view taken along lines 17A of FIG. 17, showing a top view of a fourth vessel 410 and the liquid 114 therein. In this embodiment, the fourth vessel 410 comprises a first vessel portion 446 and a second vessel portion 448. The image capturing device 112 comprises a first image capturing portion 442 for viewing a first length 490 of the liquid 114 in the first vessel portion 446 and a second image capturing portion 460 for viewing a second length 492 of the liquid 114 in the second vessel portion 448. In the illustrated embodiment, the first length 490 is the sum of lengths of a first section 478 and a second section 480, and the second length 492 is the sum of the lengths of a first section 482 and a second section 484. However, in other embodiments, the first length 490 and the second length 492 may include just single lengths, depending on, for example, the shape of the first vessel portion 446 and the second vessel portion 448. Further, in the illustrated embodiment, the first and second image capturing portions 442, 460 are shown as linear image sensors for providing information regarding just the length, rather than a more complex image as might be shown by provided by a camera, for example.

The first vessel portion 446 and the second vessel portion 448 may be configured such that a combination of the first length 490 and the second length 492 varies between a plurality of unique combinations thereof. Each of the plurality of unique combinations, as viewed by the first and second image capturing portions 442, 460, is the only combination of the first length 490 and the second length 492 for a given combination of the quantity of the liquid 114 in the first and second vessel portions 446, 448 and an orientation of the liquid surface 118 relative to the first and second vessel portions 446, 448. As shown, the liquid surface 118 includes a first portion 494a, a second portion 494b, a third portion 494c, and a fourth portion 494d.

Alternatively, the first vessel portion 446 and the second vessel portion 448 may be configured such that a combination of the length of the first section 478, the length of the second section 480, the length of the first section 482, and the length of the second section 484 varies between a plurality of unique combinations thereof. Each of the plurality of unique combinations, as viewed by the first and second image capturing portions 442, 460, is the only combination of the lengths of the sections 478, 480, 482, 484 for a given combination of the quantity of the liquid 114 in the first and second vessel portions 446, 448 and an orientation of the liquid surface 118 relative to the first and second vessel portions 446, 448.

A light source 430 is positioned so as to illuminate and enhance the image or, more specifically, the first portion 494a, the second portion 494b, the third portion 494c, and the fourth portion 494d. The light source 430 is shown as having a first light source portion 436 and a second light source portion 472, the first light source portion 436 being used to illuminate the interior of the first vessel portion 446, and the second light source portion 472 being used to illuminate the interior of the second vessel portion 448. The first light source portion 436 is shown comprising a plurality of lights elements 438, while the second light source portion 472 is shown comprising a plurality of light elements 470.

The first vessel portion 446 and the second vessel portion 448, as viewed from a top view thereof, may form one of an "L-shape, a "T-shape," and a "V-shape." Alternatively, the first vessel portion 446 and the second vessel portion 448 may be spaced apart from one another, the first vessel portion 446 is on a side of the tank 120, and the second vessel portion 448 is positioned on an opposite side of the tank 120. The first vessel portion 446 comprises a first pair of legs 462 extending away from the first image capturing portion 442, each of the legs of the first pair 462 forming a "V-shape" so as to open towards the first image capturing portion 442. Likewise, the second vessel portion 448 comprises a second pair of legs 466 extending away from the second image capturing portion 460, each of the legs of the second pair 466 forms a "V-shape" so as to open towards the second image capturing portion 460.

The first vessel portion 446 has a first set of lower openings 452 and a first upper opening 464, and the second vessel portion 448 has a second set of lower openings 458 and a second upper opening (not shown). The first set of lower openings 452 and the first upper opening 464 function similarly to the first opening 122 and the second opening 124 used in, for example, the first system 100. Likewise, the second set of lower openings 458 and the second upper opening (not shown) function similarly, too.

FIG. 18 is a schematic view of the fourth system 400, the fourth system 400 being shown in an upward position and having a low level of liquid 114 therein, and FIG. 18A is a top sectional view taken along lines 18A of FIG. 18, showing a top view of the fourth vessel 410 and the liquid 114 therein. Further, FIG. 19 is a schematic view of the fourth system 400, the fourth system 400 being shown, in a downward and slightly rightward position, having a low level of liquid 114 therein, and FIG. 19A is a top sectional view taken along lines 19A of FIG. 19, showing a top view of the fourth vessel 410 and the liquid 114 therein.

Figure 20A:
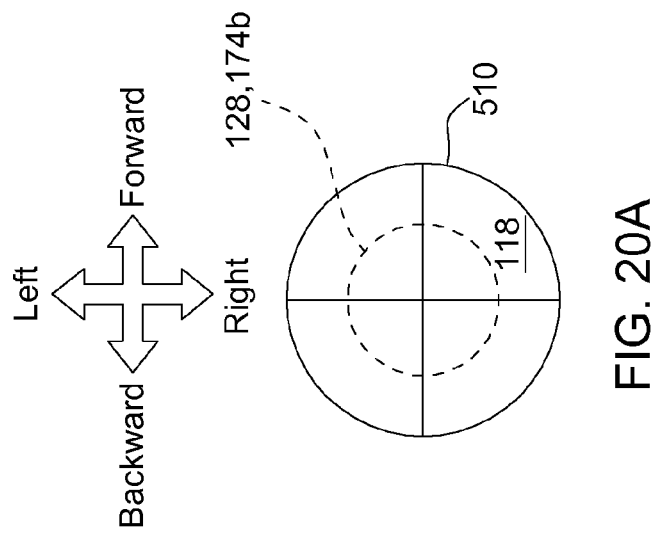
FIG. 20A is a top sectional view taken along lines 20A of FIG. 20, showing a top view of the fifth vessel and the liquid therein.
Figure 20:
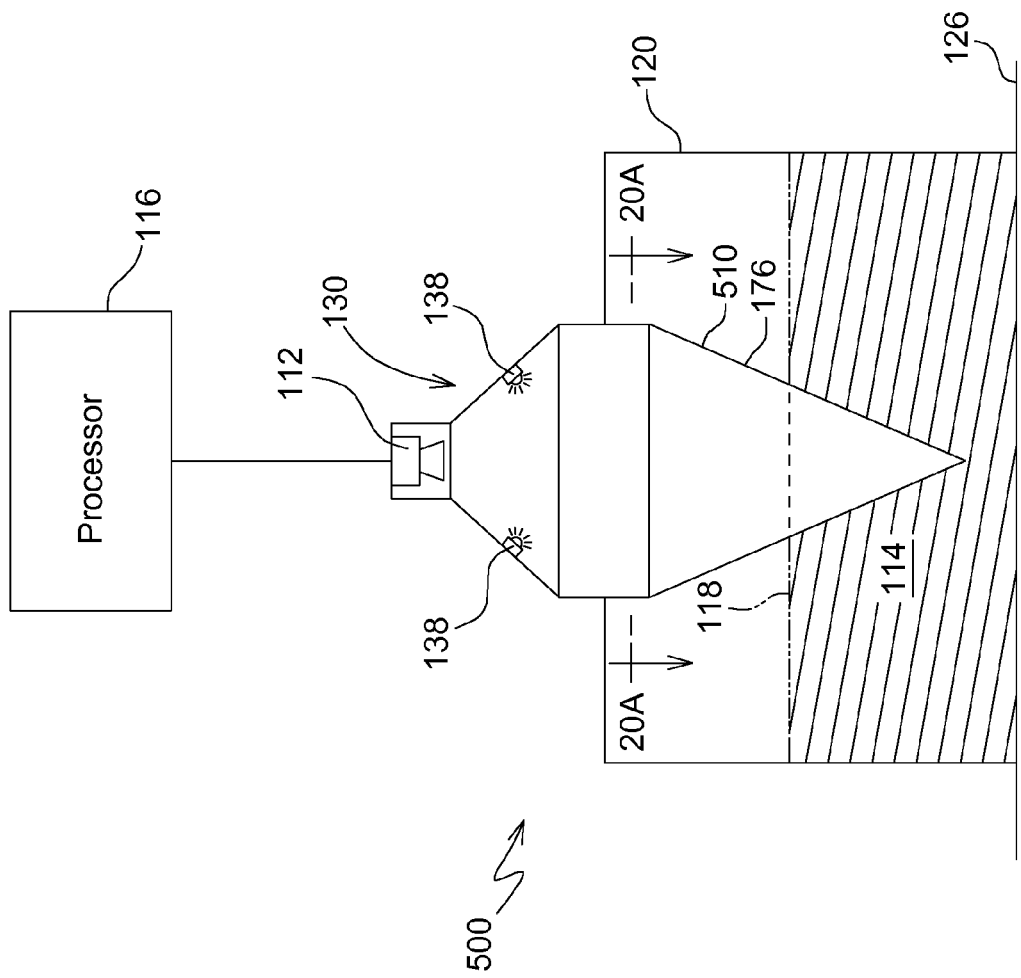
FIG. 20 is a schematic view of a fifth system, the system being shown, in a level position, having a medium level of liquid therein.

FIG. 20 is a schematic view of a fifth system 500, the fifth system 500 being shown, in a level position, having a medium level of liquid 114 therein, and FIG. 20A is a top sectional view taken along lines 20A of FIG. 20, showing a top view of the fifth vessel 510 and the liquid 114 therein.

Figure 23A:
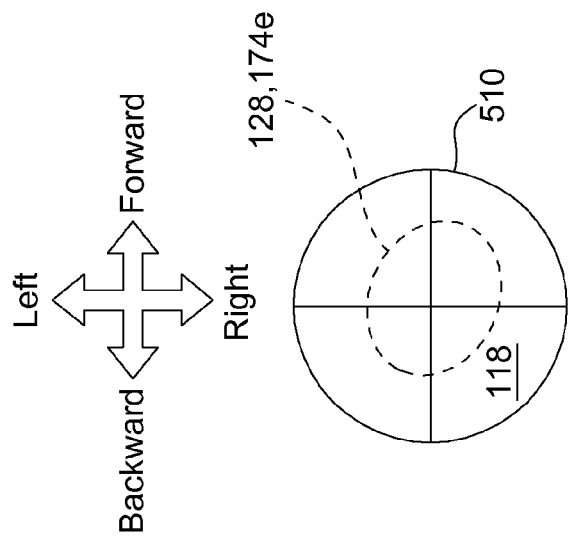
FIG. 23A is a top sectional view taken along lines 23A of FIG. 23, showing a top view of the fifth vessel and the liquid therein.
Figure 23:
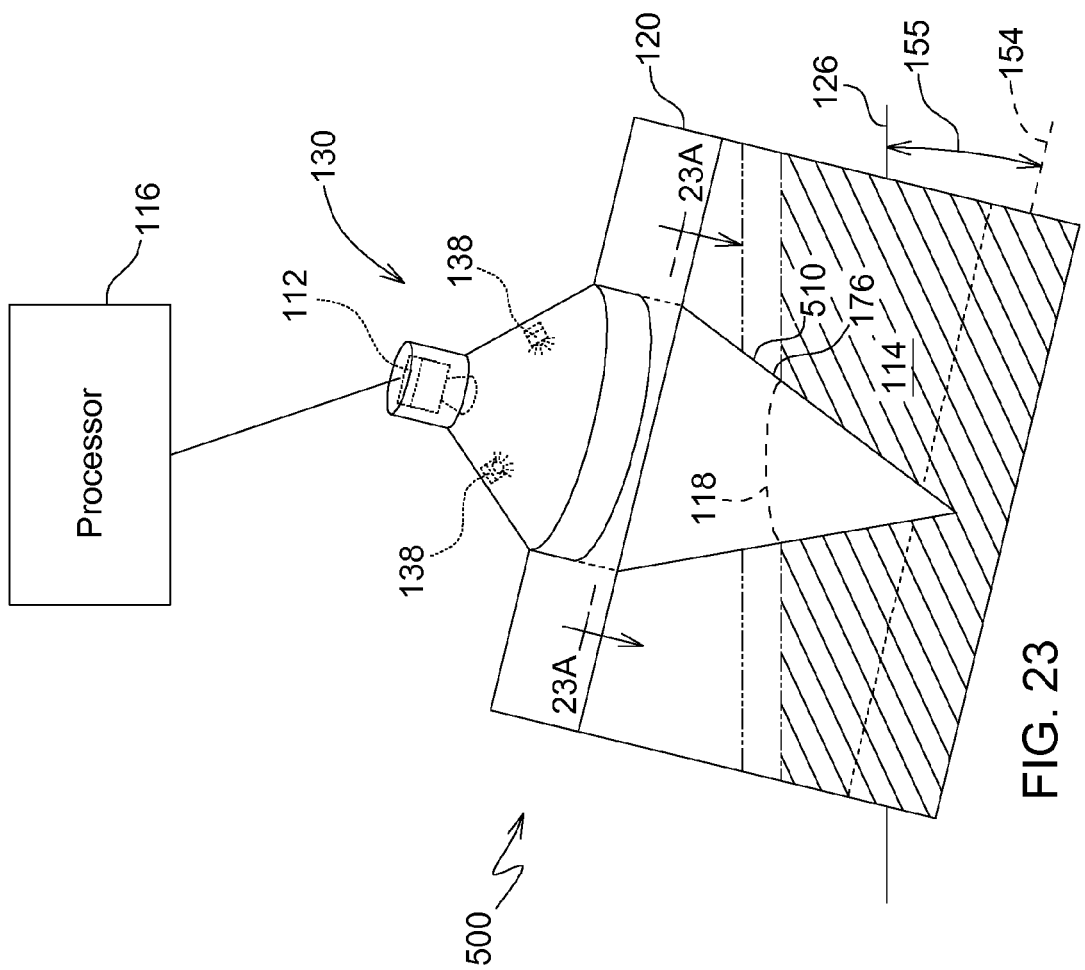
FIG. 23 is a schematic view of the fifth system, the system being shown, in a downward and slightly rightward position, having a medium level of liquid therein.

Further yet, FIG. 21 is a schematic view of the fifth system 500, the fifth system 500 being shown in a level position and having a high level of liquid 114 therein, and FIG. 21A is a top sectional view taken along lines 21A of FIG. 21, showing a top view of the fifth vessel 510 and the liquid 114 therein. Still further, FIG. 22 is a schematic view of the fifth system 500, the fifth system 500 being shown in an upward position and having a low level of liquid 114 therein, and FIG. 22A is a top sectional view taken along lines 22A of FIG. 22, showing a top view of the fifth vessel 510 and the liquid 114 therein. And finally, FIG. 23 is a schematic view of the fifth system 500, the fifth system 500 being shown in a downward and slightly rightward position having a medium level of liquid 114 therein, and FIG. 23A is a top sectional view taken along lines 23A of FIG. 23, showing a top view of the fifth vessel 510 and the liquid 114 therein.

In these illustrations, the intersection of the liquid surface 118 and the fifth vessel 510 defines a uniquely positioned sectional periphery 128. Here, the intersection of the liquid surface 118 and the fifth vessel 510, as viewed by the image capturing device 112, is on an outside side of the first vessel 510. The characteristic of the image of the liquid surface 118 is the uniquely positioned sectional periphery 128. In this embodiment, the fifth vessel 510 may be at least slightly transparent, so that image captured by the image capturing device 112 shows the intersection of the liquid surface 118 and fifth vessel 510.

While the disclosure has been illustrated and described in detail in the drawings and foregoing description, such illustration and description is to be considered as exemplary and not restrictive in character, it being understood that illustrative embodiments have been shown and described and that all changes and modifications that come within the spirit of the disclosure are desired to be protected. It will be noted that alternative embodiments of the present disclosure may not include all of the features described yet still benefit from at least some of the advantages of such features. Those of ordinary skill in the art may readily devise their own implementations that incorporate one or more of the features of the present disclosure and fall within the spirit and scope of the present invention as defined by the appended claims.

The invention claimed is:
1. A system, comprising:
   a vessel configured to at least partially contact a liquid, the liquid having a liquid surface that is defined by a quantity of the liquid, a shape of the vessel, and an orientation of the vessel relative to a horizontal plane, the vessel comprising a first opening and a second opening, the first opening being positioned so as to allow the liquid to enter and exit the vessel depending on the quantity of the liquid in the vessel and the orientation of the vessel relative to the horizontal plane, the second opening being positioned so as to allow a gas in the vessel to enter and exit therefrom depending on the quantity of the liquid in the vessel and the orientation of the vessel relative to the horizontal plane;
   an image capturing device spaced apart from and positioned to face the liquid surface, the image capturing device positioned so as to face an inside side of the vessel, the image capturing device configured to capture an image of a shape of an intersection of the liquid surface and the vessel, the intersection of the liquid surface and the vessel defining a uniquely positioned sectional periphery;

a processor in communication with the image capturing device, the processor being configured to determine an attribute of the liquid based on the uniquely positioned sectional periphery; and a tank configured to contact the liquid and surround at least a portion of the vessel, an inside of the tank being in fluid communication with an inside of the vessel, the intersection of the liquid surface and the vessel, as viewed by the image capturing device, being on an inside side of the vessel, and the tank being in fluid communication with the first and second openings.

2. The system of claim 1, wherein the attribute of the liquid is the quantity of the liquid.

3. The system of claim 1, wherein the attribute of the liquid is an orientation of the liquid surface relative to the vessel, and the processor is configured to determine an orientation of a machine comprising the system relative to the horizontal plane based on the orientation of the liquid surface relative to the vessel.

4. The system of claim 1, wherein the image capturing device is a linear image sensor that is fixed to the vessel to move therewith.

5. The system of claim 1, comprising a light source positioned on the inside side of the vessel so as to directly illuminate and enhance the intersection of the liquid surface and the vessel.

6. The system of claim 1, wherein:
the vessel is configured such that the uniquely positioned sectional periphery varies between a plurality of uniquely positioned sectional peripheries; and
each of the plurality of uniquely positioned sectional peripheries, as viewed by the image capturing device, is an only sectional periphery for a given combination of the quantity of the liquid in the vessel and the orientation of the liquid surface relative to the vessel.

7. The system of claim 6, wherein an inside of the tank is not in fluid communication with an inside of the vessel, and the intersection of the liquid surface and the vessel, as viewed by the image capturing device, is on an outside side of the vessel.

8. The system of claim 1, wherein:
the vessel comprises a cone shaped portion, the intersection of the liquid surface and the vessel is an intersection of the liquid surface and the cone shaped portion, the intersection of the liquid surface and the cone shaped portion defines the uniquely positioned sectional periphery;
the cone shaped portion is configured such that the uniquely positioned sectional periphery varies between a plurality of uniquely positioned sectional peripheries; and
each of the plurality of uniquely positioned sectional peripheries, as viewed by the image capturing device, is an only sectional periphery for a given combination of the quantity of the liquid in the vessel and an orientation of the liquid surface relative to the cone shaped portion.

9. The system of claim 8, wherein an inside of the tank is in fluid communication with an inside of the vessel, and the intersection of the liquid surface and the cone shaped portion, as viewed by the image capturing device, is on an inside side of the vessel.

10. The system of claim 1, comprising an inner structure surrounded by the vessel, wherein:
the inner structure and the vessel cooperate so as to define an inner vessel, the liquid is positioned in the inner vessel
an intersection of the liquid surface and the inner vessel defines a uniquely positioned sectional periphery, the characteristic of the image of the liquid surface is the uniquely positioned sectional periphery;
the inner vessel is configured such that the uniquely positioned sectional periphery varies between a plurality of uniquely positioned sectional peripheries; and
each of the plurality of uniquely positioned sectional peripheries, as viewed by the image capturing device, is an only sectional periphery for a given combination of the quantity of the liquid in the inner vessel and an orientation of the liquid surface relative to the vessel.

11. The system of claim 1, wherein:
the vessel comprises a first vessel portion and a second vessel portion;
the image capturing device comprises a first image capturing portion for viewing a first length of the liquid in the first vessel portion and a second image capturing portion for viewing a second length of the liquid in the second vessel portion, the first and second image capturing portions are linear image sensors;
the first vessel portion and the second vessel portion are configured such that a combination of the first length and the second length varies between a plurality of unique combinations thereof; and
each of the plurality of unique combinations, as viewed by the first and second image capturing portions, is an only combination of the first length and the second length for a given combination of the quantity of the liquid in the first and second vessel portions and an orientation of the liquid surface relative to the first and second vessel portions.

12. The system of claim 11, wherein an intersection of the liquid surface and the vessel, as viewed by the image capturing device, is on an outside side of the vessel.

13. The system of claim 11, wherein an intersection of the liquid surface and the vessel, as viewed by the image capturing device, is on an inside side of the vessel.

14. The system of claim 11, wherein the first vessel portion and the second vessel portion, as viewed from a top view thereof, form one of an "L-shape," a "T-shape," and a "V-shape".

15. The system of claim 11, wherein:
the first vessel portion comprises a first pair of legs extending away from the first image capturing portion, each of the legs of the first pair thereof forms a "V-shape" so as to open towards the first image capturing portion; and
the second vessel portion comprises a second pair of legs extending away from the second image capturing portion, each of the legs of the second pair thereof forms a "V-shape" so as to open towards the second image capturing portion.

16. The system of claim 1, wherein the processor is configured to determine the attribute of the liquid based on the shape of the uniquely positioned sectional periphery.

17. A system, comprising:
a vessel comprising a cone shaped portion, the vessel configured to at least partially contact a liquid, the liquid having a liquid surface that is defined by a quantity of the liquid, a shape of the vessel, and an orientation of the vessel relative to a horizontal plane;
an image capturing device spaced apart from and positioned to face the liquid surface, the image capturing device positioned so as to face an inside side of the vessel, the image capturing device configured to capture an image of a shape of an intersection of the liquid surface and the cone shaped portion, the intersection of the liquid surface and the cone shaped portion defining a uniquely positioned sectional periphery, the cone shaped portion being configured such that the uniquely positioned sectional periphery varies between a plurality of uniquely positioned sectional peripheries, each of the plurality of uniquely positioned sectional peripheries, as viewed by the image capturing device, is an only sectional periphery for a given combination of the quantity of the liquid in the vessel and an orientation of the liquid surface relative to the cone shaped portion;

a processor in communication with the image capturing device, the processor being configured to determine an attribute of the liquid based on the uniquely positioned sectional periphery; and a tank configured to contact the liquid and surround at least a portion of the vessel.

* * * * *